United States Patent [19]
Mita et al.

[11] Patent Number: 5,497,361
[45] Date of Patent: Mar. 5, 1996

[54] INFORMATION REPRODUCING APPARATUS WITH A DC LEVEL CORRECTING CAPABILITY

[75] Inventors: Seiichi Mita, Kanagawa; Toru Kawashima, Fujisawa; Masanori Matsuzaki, Chigasaki; Toshimitsu Kaku, Sagamihara; Hiroyuki Tsuchinaga, Kokubunji, all of Japan

[73] Assignees: Hitachi, Ltd., Tokyo; Hitachi Video and Information System, Inc., Kanagawa, both of Japan

[21] Appl. No.: 155,228

[22] Filed: Nov. 22, 1993

Related U.S. Application Data

[63] Continuation-in-part of Ser. No. 28,224, Mar. 9, 1993, Pat. No. 5,412,632.

[30] Foreign Application Priority Data

| Mar. 13, 1992 | [JP] | Japan | 4-054773 |
| Nov. 20, 1992 | [JP] | Japan | 4-311682 |
| Jan. 28, 1993 | [JP] | Japan | 5-012277 |
| Jan. 28, 1993 | [JP] | Japan | 5-012278 |

[51] Int. Cl.⁶ .................................................. G11B 7/00
[52] U.S. Cl. ............................ 369/48; 369/58; 369/110; 369/124
[58] Field of Search ............................ 369/48, 54, 58, 369/59, 110–111, 124

[56] References Cited

U.S. PATENT DOCUMENTS

| 4,964,000 | 10/1990 | Kanota et al. | 369/59 X |
| 5,101,395 | 3/1992 | Cardero et al. | 369/59 |
| 5,134,607 | 7/1992 | Fuji et al. | 369/124 |

OTHER PUBLICATIONS

K. Tanaka, "Signal Processing Technique in Optical Recording", 1989, pp. 116–118.

*Primary Examiner*—W. R. Young
*Attorney, Agent, or Firm*—Fay, Sharpe, Beall, Fagan, Minnich & McKee

[57] ABSTRACT

An information reproducing apparatus is capable of stably and correctly binarizing a signal reproduced from a recording medium, such as an optical disk, even if the reproduced signal contains a fluctuation of its low frequency component. The reproduced signal is replaced by an AC signal in a period other than a period during which the reproduced signal is to be demodulated so that DC fluctuation of the reproduced signal is reduced to thereby stably and correctly binarize the reproduced signal.

12 Claims, 17 Drawing Sheets

F I G. 10
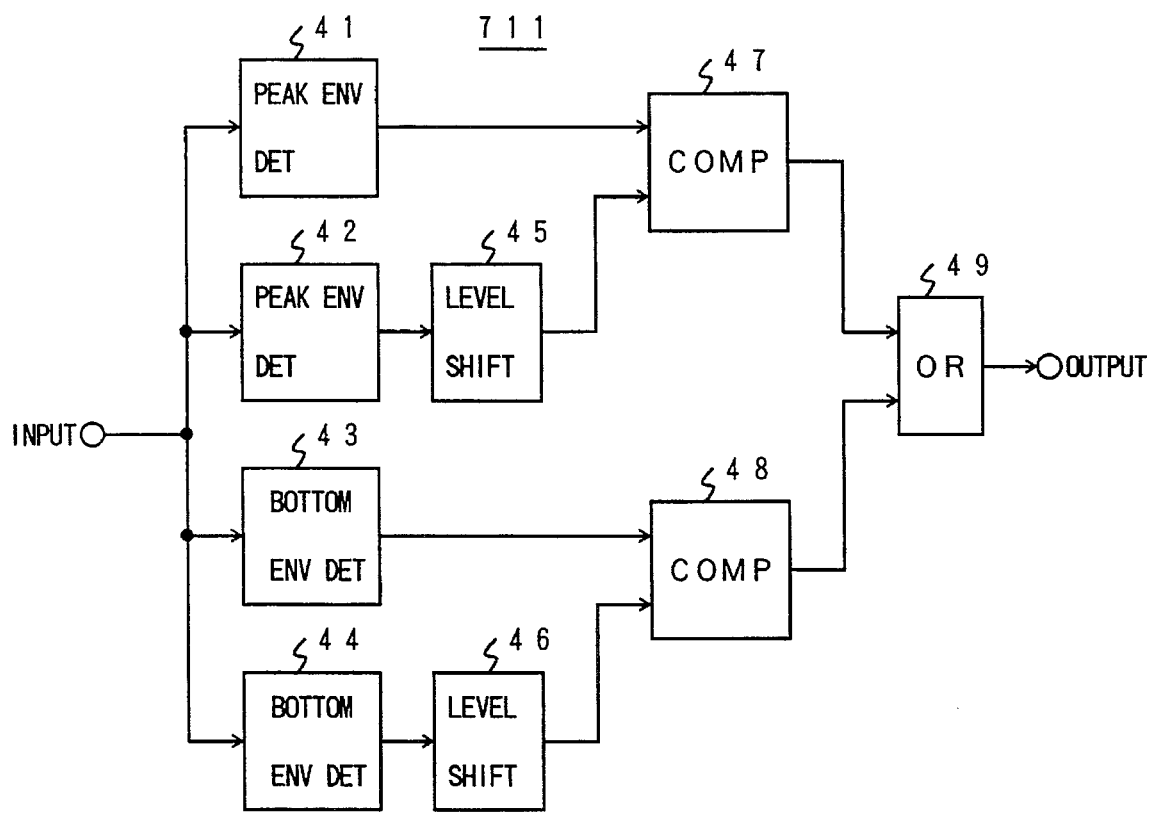

INFORMATION REPRODUCING APPARATUS WITH A DC LEVEL CORRECTING CAPABILITY

This application is a continuation-in-part of U.S. application Ser. No. 08/028,224 filed on Mar. 9, 1993, now U.S. Pat. No. 5,413,632, entitled "INFORMATION REPRODUCING APPARATUS WITH A DC LEVEL CORRECTING CAPABILITY", which is incorporated herein by reference.

BACKGROUND OF THE INVENTION

1. Field of the Invention

This invention relates to an apparatus for reproducing signals recorded in a recording medium. More particularly, it relates to an information reproducing apparatus which can appropriately treat reproduced signals having a fluctuation in low frequency components.

2. Related Art

In an optical disk drive, the shape of a record mark fluctuates for such reasons as the fluctuation of the emission power of a semiconductor laser ascribable to the surroundings of the laser, and the fluctuation of the sensitivity of an optical disk medium ascribable to the surroundings of the medium and the discrepant sensitivities of individual media. In a reproducing or playback operation, the fluctuation of the shape of the record mark incurs even-order distortions, resulting in the disadvantage that the duty factor of a reproduced signal fluctuates. It is necessary to eliminate the distortions to appropriately control the slice level of a wave-shaping circuit (binarizing comparator) for turning the reproduced signal into a binary level. An example of a method for the slice level control is stated in "Signal Processing Technique in Optical Recording" compiled by Kunimaro Tanaka, issued by Kabushiki-Kaisha Torikeppusu in 1989, pp. 116–118.

FIG. 3 of the accompanying drawings illustrates an example of an arrangement of a signal reproducing circuit. A laser beam is focused onto the track of an optical disk that has been subjected to mark length recording. Light thus reflected from the optical disk is used for obtaining a reproduced signal a, which is amplified to a desired amplitude by an amplifier 1. The reproduced signal a undergoes the fluctuation of a low frequency component (hereinbelow, the fluctuation shall be called the "retardation") on account of the fluctuations of the reflectance and double-refractive index of the disk, the deviation of the laser beam from the center of the track, etc. The amplified reproduced signal is passed through a high-pass filter (hereinbelow, abbreviated to "HPF") 2 in order to eliminate the retardation.

Subsequently, in order to demodulate recorded information, the reproduced signal b delivered from the HPF 2 is input to a wave-shaping circuit 3 which includes a reproduced-signal binarization means. On the other hand, the reproduced signal b is also input to an upper or peak envelope detecting circuit 4 and a lower or bottom envelope detecting circuit 5 which detect the peak and bottom envelopes of the input signal b, respectively. The outputs c and d of the respective detectors 4 and 5 have their difference e taken by a difference circuit 6, thereby obtaining a level which is equal to ½ of the amplitude of the input signal b of the wave-shaping circuit 3.

The slice level of the input waveform of the wave-shaping circuit 3 is set at the ½ level of the amplitude of a signal reproduced from a sync region for phase-locking a demodulating clock signal. The synchronizing signal of the sync region generated by a VFO (variable frequency oscillator) is contained in the headers of a plurality of areas (hereinbelow, termed "sectors") into which the recording medium is divided, and the aforementioned sync region shall be also termed the "VFO part" below.

For the purpose of the above level setting, a sample-and-hold circuit 7 is controlled by a VFO gate f indicative of the VFO part so as to apply the ½ level of the VFO part as the slice level g of the wave-shaping circuit 3. The ½ level of the VFO part is adopted as the slice level g because the signal duty factor of the waveform of the VFO part is 50 in the mark length recording, so the center level of the waveform becomes the appropriate slice level of the recorded data.

Further, the setting of the slice level g is limited to the VFO part for the following reasons: The VFO part serves as a reference for phase-locking the reproduced signal. Since the part of the reproduced signal except the VFO part has a diverse duty factor and becomes different in the sensitivities of peak envelope detection and bottom envelope detection, it does not serve as the appropriate slice level for all the reproduced signals.

FIG. 4 illustrates the waveforms of the signals at the various parts of the signal reproducing circuit shown in FIG. 3. Hereafter, the circumstances of the signal reproduction shall be explained concerning a case where the signal is recorded on only a part of one track as depicted at a in FIG. 4. Further, for brevity of explanation, it is assumed that the waveform of the VFO part has a signal duty factor of 50, so the center level thereof, being the appropriate slice level for the binarization (for turning the reproduced signal into the binary level), is equal to the mean level between a non-recording level and a DC (direct current) recording level.

The reproduced signal a shown in FIG. 4 is passed through the HPF 2 giving a resultant waveform b in FIG. 4, which is applied to one input of the wave-shaping circuit 3. On the other hand, the outputs of the peak envelope detecting circuit 4 and bottom envelope detecting circuit 5 become as shown by the waveforms c and d in FIG. 4, respectively. The output of the difference circuit 6, which is the difference waveform of the outputs c and d, becomes as shown by the waveform e in FIG. 4. This waveform e is equal to the DC level fluctuation of the reproduced signal which has developed in the HPF 2 at the VFO part (namely, in correspondence with the high level of the VFO gate f shown in FIG. 4). At any other part, however, the waveform e is not necessarily equal to the DC level fluctuation which has developed in the HPF 2. For this reason, the VFO gate f is set at the low level except for at the VFO part, and the output e of the difference circuit 6 is held in correspondence with the final part or trailing edge of the VFO part by the sample-and-hold circuit 7. Thus, the waveform g shown in FIG. 4 is applied to the other input of the wave-shaping circuit 3. Incidentally, a waveform indicated by a broken line at g in FIG. 4 is the waveform b which is one input signal of the wave-shaping circuit 3 as stated above.

In the case as shown in FIG. 4 where the VFO part is shorter than the transient response time of the settling of the DC level fluctuation based on the HPF 2, the slice level of the wave-shaping circuit 3 is held before the DC level fluctuation has settled. In consequence, the slice level deviates from the appropriate value (indicated by a dotted line at g in FIG. 4) to the amount of the DC level fluctuation of the HPF 2 which arises after the holding operation. This incurs the problem that the signal recorded on only part of the track cannot be read correctly.

The problem is not limited to the case where the signal is recorded on only part of the track, but similar problems occur in cases where momentary DC level fluctuations are involved in the reproduced signal. More specifically, the momentary fluctuations arise, for example, i) at the boundary between a preformat part (such as an address signal part) and an additionally written data part (data signal part) in the magneto-optical disk, ii) immediately after the operation of seeking a track, iii) immediately after the reproduction of a major defect, and iv) immediately after recording or erasing a signal. Regarding the item i), a preformat signal (such as an address signal) in the preformat area is recorded in the form of ruggedness (such as grooves or pits) of the recording medium. On the other hand, a data signal which is additionally written in the data area by a user is recorded in the form of a change of the magnetic field of the recording medium. Therefore, detecting methods for the two signals are different, and the DC levels of a reproduced signal respectively obtained from the preformat area and the data area are also different. Meanwhile, regarding the items ii)~iv), correct signals are not detected immediately after the seek operation, the reproduction of the defect, and the recording or erasing operation. Signals reproduced on these occasions have diverse DC levels. When the correct signals are thereafter reproduced, the DC level fluctuations take place.

Moreover, when the VFO part, being a specific pattern part, is defective, the control means based on the signal of the specific pattern part cannot perform an appropriate control.

SUMMARY OF THE INVENTION

It is therefore an object of the invention to provide an information reproducing apparatus capable of correctly reading data from a recording medium which has nonrecording areas or defective areas thereon in a case where a reproduced signal from the recording medium is binarized without eliminating frequency components lower than a recorded signal frequency band from within the reproduced signal.

It is another object of the invention to provide an information reproducing apparatus capable of eliminating an influence due to a sag of a high-pass filter (HPF) in a case where a reproduced signal from the recording medium is binarized after eliminating frequency components lower than a recorded signal frequency band from within the reproduced signal.

It is a further object of the invention to provide an information recording apparatus capable of eliminating frequency components lower than a recorded signal frequency band from within the reproduced signal by means of an arithmetic circuit.

According to an aspect of the invention, there is provided an information reproducing apparatus for reproducing recorded information from a recording medium in which each sector has at least one area bearing a specific pattern expressive of a synchronizing signal for phase-locking a clock signal for demodulating data, comprising:

a reproduction device for deriving a reproduced signal from the recording medium;

a DC (direct current) level correction circuit for correcting a DC level of the reproduced signal so that a DC level of a part of the reproduced signal corresponding to the specific pattern as derived by the reproduction device agrees with a predetermined reference level;

a terminal for receiving a read gate signal indicative of a time period during which said reproduced signal derived by the reproduction device is to be demodulated;

an AC (alternating current) signal generator for generating an AC signal whose average potential is equal to the predetermined reference level; and a signal replacement circuit for substituting the AC signal for the reproduced signal in a time period other than the time period indicated so as to demodulate the reproduced signal by the read gate signal.

In this arrangement, the AC signal may have a duty factor of 5.

Further, the information apparatus may include a detection circuit for detecting an inferior signal which is contained in the reproduced signal on account of any defect of the recording medium, the signal replacement circuit substituting the AC signal for the inferior signal when the inferior signal has been detected by the detection circuit.

With this first arrangement of the invention, the reproduced signal is replaced by the AC signal in a period other than a period during which the reproduced signal is to be demodulated so that DC fluctuation of the reproduced signal is reduced to thereby stably and correctly binarize the reproduced signal.

According to another aspect of the invention, there is provided an information reproducing apparatus for reproducing information recorded on a recording medium having a VFO (variable frequency oscillator) part in which a synchronizing signal for phase-locking a clock signal for demodulating a reproduced signal is recorded, comprising:

a reproduction device for deriving the reproduced signal which contains a fluctuation of a low frequency component, from the recording medium;

a first filter which eliminates the low frequency component from within the reproduced signal delivered from the reproduction device;

a first detection circuit for detecting a change of said reproduced signal attributed to the transient response of an output of said first filter which develops due to an average DC (direct current) potential fluctuation of the reproduced signal during a reproduction time period for the VFO part of the recording medium;

a second detection circuit including a second filter of the same degree (order) and time constant as those of the first filter, for detecting a change of the reproduced signal attributed to the transient response of an output of the first filter which develops during a time period other than the reproduction time period for the VFO part;

an addition circuit for adding up the outputs of the first and second detection circuits; and a subtraction circuit for subtracting an output of the addition circuit from the output of the first filter.

In this information reproducing apparatus, the first filter may be constituted by a high-pass filter while the second filter may be constituted by a low-pass filter which receives the reproduced signal, and an inverter circuit which inverts an output of the low-pass filter.

Alternatively, the second filter may be constituted by a high-pass filter which receives the reproduced signal.

With this second arrangement of the invention, the retardation is eliminated by using a high-pass filter while detecting and correcting the variation of the reproduced signal due to the sag of the high-pass filter. Thus, the reproduced signal can be binarized with a constant or fixed slice level even in a case where the recording medium has only a part of a track recorded.

According to a further aspect of the invention, there is provided an information reproducing apparatus for reproducing recorded information from a recording medium in which each sector has at least one area bearing a specific pattern expressive of a synchronizing signal for phase-locking a clock signal for demodulating data, comprising:

a reproduction device for deriving a reproduced signal which contains a fluctuation of a low frequency component, from said recording medium;

a detection circuit for detecting the low frequency component from within the reproduced signal delivered from the reproduction device;

a subtraction circuit for subtracting the low frequency component detected by the detection circuit, from the reproduced signal; and a binarization circuit for converting an output of the subtraction circuit into a bi-level signal.

In this information reproducing apparatus, the detection circuit is a low-pass filter which passes the low frequency component of the reproduced signal.

With this third arrangement of the invention, a subtracting processing for waveforms provides a stable reproduced signal, thereby allowing a binarization of the reproduced signal with a fixed slice level even in a case where the recording medium has only a part of a track recorded.

BRIEF DESCRIPTION OF THE DRAWINGS

FIG. 10 is a block diagram showing an example of a defect detecting circuit (711) which is included in the apparatus depicted in FIG. 1;

DETAILED DESCRIPTION OF THE PREFERRED EMBODIMENTS

Now, embodiments in which a signal is binarized (turned into a binary level) without removing a frequency component lower than a recording signal band will be described in conjunction with FIGS. 1 through 6A and 6B.

Figure 1:
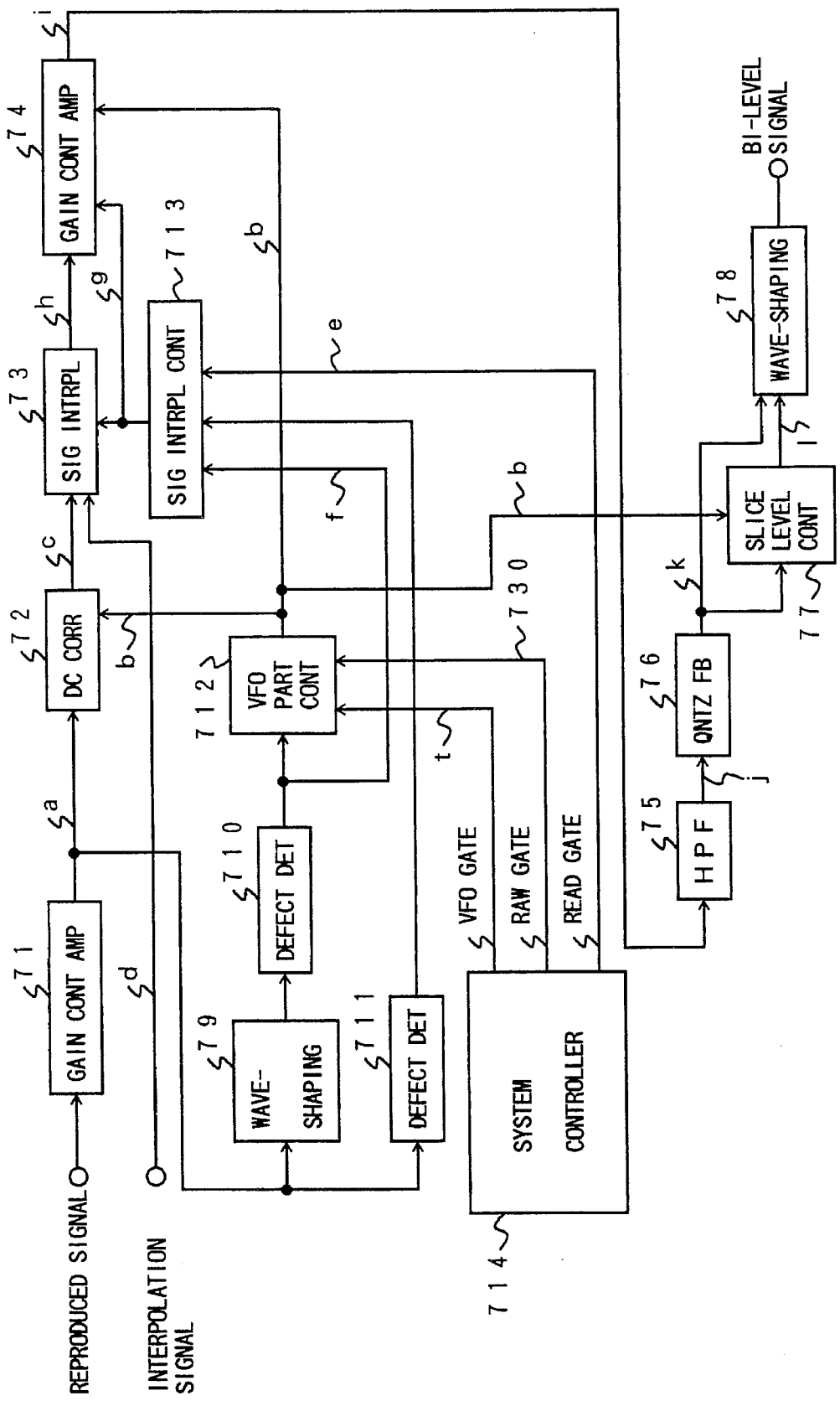
FIG. 1 is a block diagram of a signal reproducing apparatus showing an embodiment of the present invention.
Figure 2:
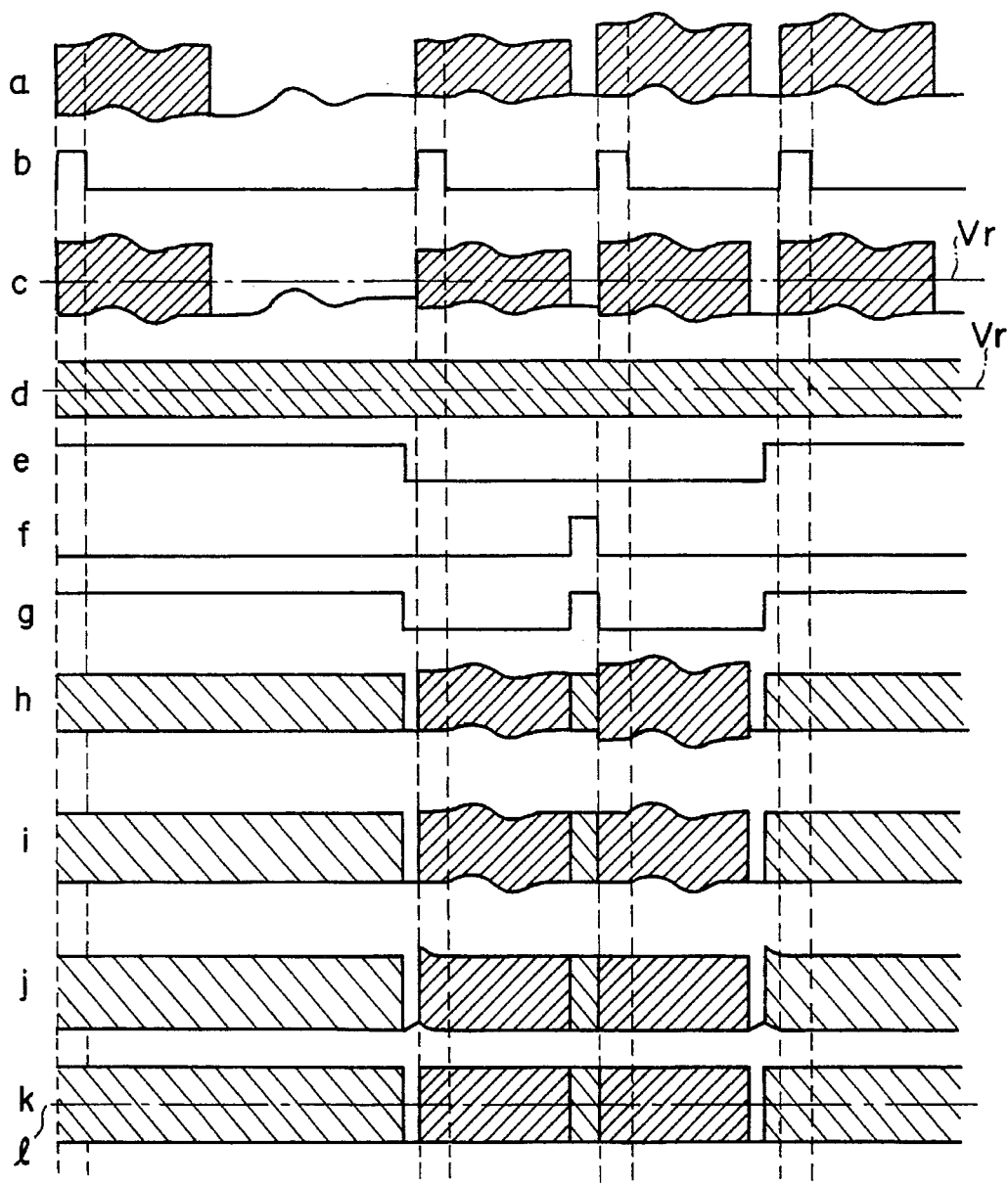
FIGS. 2(a–l) is a waveform diagram for explaining the operation of the apparatus depicted in FIG. 1.

FIG. 1 is a block diagram of a signal reproducing apparatus illustrative of an embodiment of the present invention. FIG. 2 is a diagram showing waveforms at various parts in FIG. 1 in order to explain the operation of the signal reproducing apparatus. Incidentally, reference symbols "a"–"t" in FIGS. 1 and 2, FIGS. 5A and 5B, and FIGS. 6A and 6B designate positions different from those of reference symbols "a"–"g" in FIGS. 3 and 4.

Referring to FIGS. 1 and 2, a reproduced signal derived from a recording medium is amplified (into a waveform a) by a gain control amplifier 71 which controls the amplitude of the reproduced signal in accordance with the reflectance information of the recording medium recorded on this recording medium beforehand. The amplified signal a is input to a DC (direct current) correction circuit 72 and a wave-shaping circuit 79. The DC correction circuit 72 corrects the DC level of the reproduced signal under the control of a control signal b which is delivered from a VFO (variable frequency oscillator) part control circuit 712. In the DC level correction, the center potential or average potential of the peak and bottom envelope potentials of a VFO part (a sync region for phase-locking a demodulating clock signal) provided on the recording medium is brought into agreement with a reference potential Vr (as shown by a waveform c).

Figure 5A:
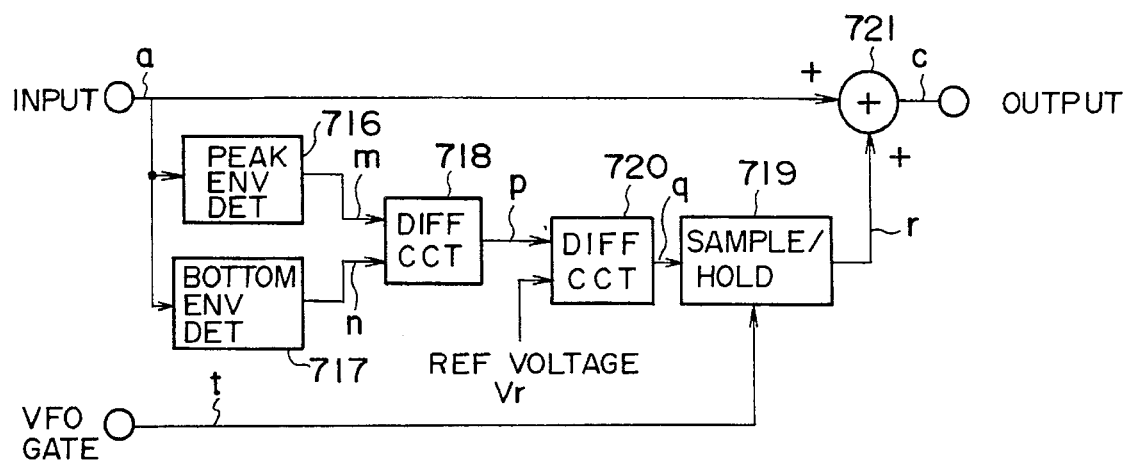
FIGS. 5A and 5B are a block diagram and an operating waveform diagram, respectively, showing a DC (direct current) correction circuit (72) which is included in the apparatus depicted in FIG. 1.
Figure 5B:
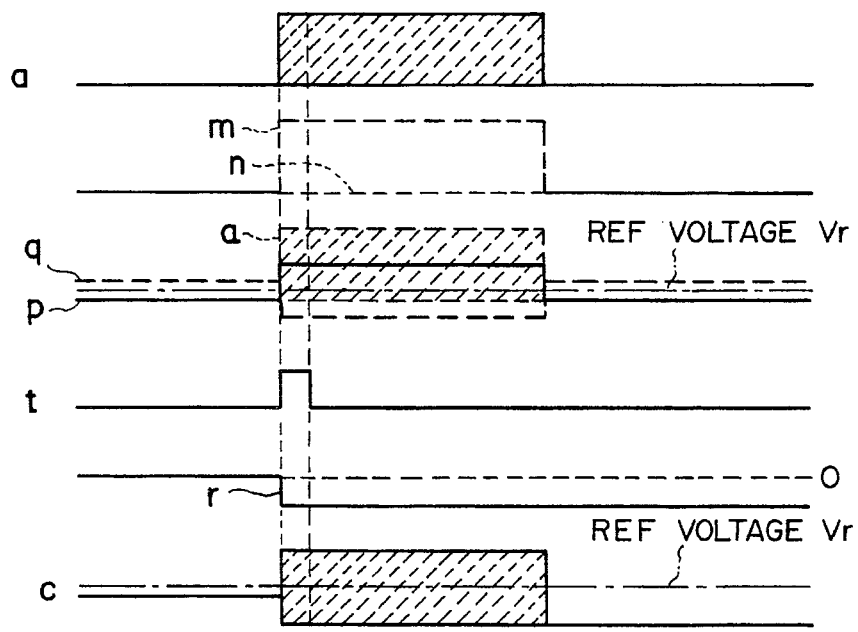

FIG. 5A illustrates an example of the DC correction circuit 72, while FIG. 5B illustrates waveforms at parts in FIG. 5A. The upper or peak envelope potential m and the lower or bottom envelope potential n detected by a peak envelope detecting circuit 717, respectively, are supplied to a difference circuit 718 which produces the center potential p. The center potential p and the reference potential Vr are supplied to a difference circuit 720, thereby obtaining a difference potential q. Subsequently, a correction signal r is obtained from a sample-and-hold circuit 719 that is controlled by a VFO gate signal t delivered from a system controller 714 (FIG. 1). Thereafter, the correction signal r is added to the input signal a by an adder 721. Thus, the DC correction circuit 72 produces the corrected output c. Alternatively, the average potential of the peak and bottom envelope potentials of the VFO part can be produced by a low-frequency cutoff filter so as to replace the center potential p mentioned above.

Referring back to FIGS. 1 and 2, the output c of the DC correction circuit 72 enters a signal interpolation circuit 73, which is controlled by a control signal g delivered from a signal interpolation control circuit 713. Thus, the signal c is replaced with an interpolation signal d whose average potential is equal to the reference potential Vr, in an area which precedes a reproduction area (an area to be reproduced) and in an unrecorded area and a comparatively-long inferior signal area which are involved in the reproduction area. The output signal h of the signal interpolation circuit 73 becomes a signal whose DC potential fluctuates very little, for the reasons that the output c of the DC correction circuit 72 corresponding to the VFO part is the signal centering at the reference potential Vr and that the average potential of the interpolation signal d is equal to the reference potential Vr. This output signal h is input to a gain control amplifier 74.

The interpolation signal d which is supplied from outside the circuit arrangement shown in FIG. 1, is a signal which has a duty factor of 50 and the frequency of which is equivalent to that of the reproduced signal. By way of example, the signal d is obtained by dividing the frequency of a signal for the frequency synchronization of a PLL (phase-locked loop). When this signal d is utilized, an oscillator (signal generator) for the interpolation signal d is not especially required, and the circuit arrangement of the signal reproducing apparatus can be simplified and can be implemented in the form of a single-chip LSI (large-scale integrated circuit). Alternatively, the interpolation signal d may be generated by a signal generator which generates that signal independently at the signal for the frequency synchronization of a PLL.

The gain control amplifier 74 is an AGC (automatic gain control) amplifier which is controlled by the control signal b delivered from the VFO part control circuit 712 and the control signal g delivered from the signal interpolation control circuit 713, and which detects the signal levels of the VFO part and the interpolation signal part and performs a control so as to keep the amplitude of the VFO part constant. Thus, a signal amplitude fluctuation which arises between the respectively adjacent sectors of the recording medium is suppressed, and a signal i which has an amplitude of substantially constant level is produced. The signal i is thereafter converted by an HPF (high-pass filter) 75 into a signal j which is free from low-frequency noise, and which is input to a quantizing feedback circuit 76.

Figure 6A:
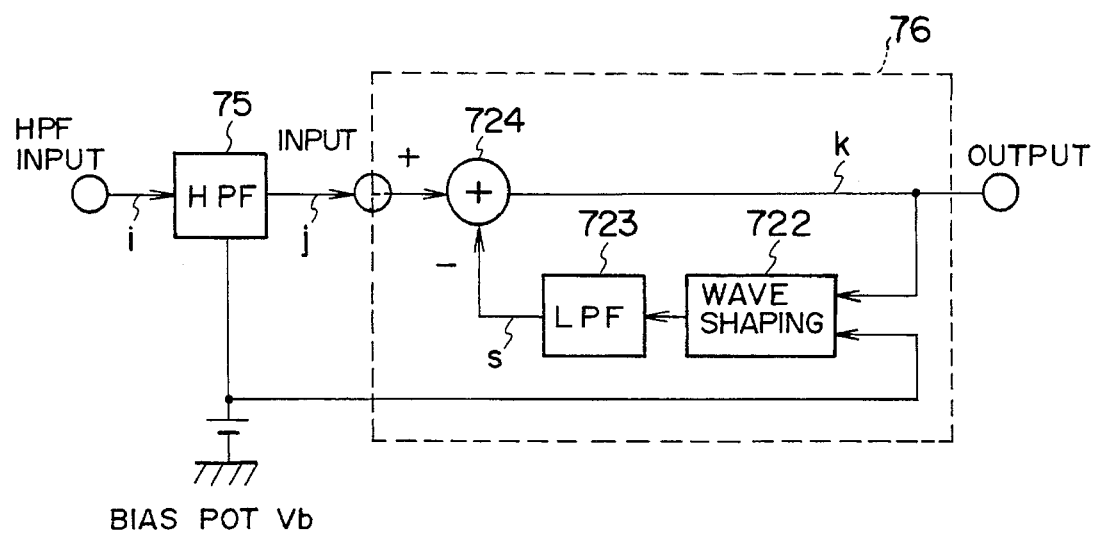
FIGS. 6A and 6B are a block diagram and an operating waveform diagram, respectively, showing a quantizing feedback circuit (76) which is included in the apparatus depicted in FIG. 1.
Figure 6B:
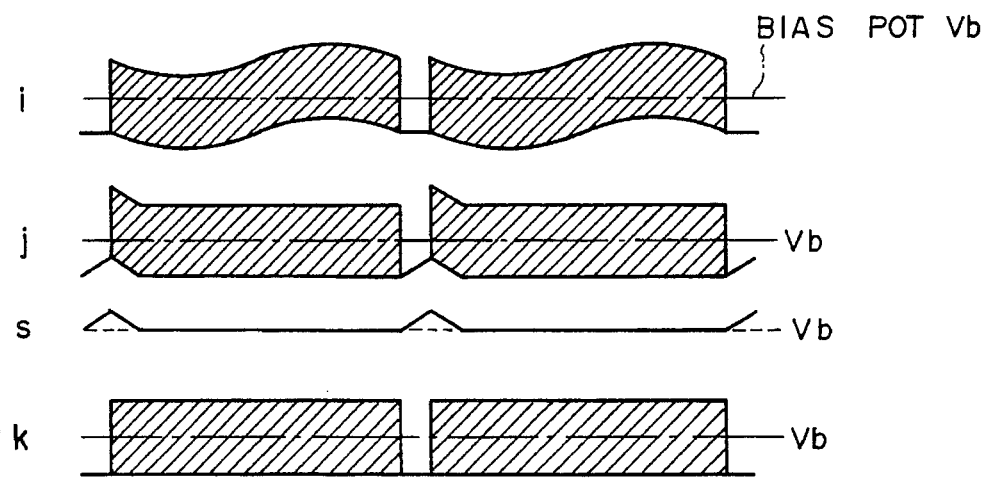

The quantizing feedback circuit 76 compensates for low-frequency cutoff in the HPF 75. FIG. 6A illustrates an example of the quantizing feedback circuit 76, while FIG. 6B illustrates waveforms at parts in FIG. 6A. Using the bias potential Vb of the HPF 75 as a slice level, the output k of the quantizing feedback circuit 76 is binarized into a bi-level signal by a wave-shaping circuit 722. Subsequently, a low-frequency component s is extracted from the bi-level signal by an LPF (low-pass filter) 723 which has a pass band inverse to that of the HPF 75. Thereafter, the low-frequency component s is subtracted from the input j of the quantizing feedback circuit 76 by a subtractor 724. Owing to such a feedback operation, a low-frequency component lost by the HPF 75 is compensated for. The output of the quantizing feedback circuit 76 becomes the reproduced signal k whose DC level fluctuates very little, whose amplitude does not fluctuate between the respectively adjacent sectors of the recording medium, and which is free from low frequency noise. It can accordingly be binarized with a fixed slice level. Depending upon the control performances of the various circuits, however, the fixed slice level is not always held appropriate between the respectively adjacent sectors.

Referring back to FIGS. 1 and 2, a slice level control circuit 77 is controlled by the control signal b delivered from the VFO part control circuit 712, and detects an appropriate slice level l at the VFO part of each sector. Binarization for demodulating the reproduced signal k is effected on the basis of the slice level l by a wave-shaping circuit 78.

The wave-shaping circuit 79 is used for detecting the areas of the recording medium where the reproduced signal is inferior and is unrecorded, in cooperation with a defect detecting circuit 710. More specifically, the defect detecting circuit 710 produces a defect detection signal f upon detecting the inferior part of the reproduced signal on the ground of the fact that the pulse repetition period or pulse duration of a bi-level signal delivered from the wave-shaping circuit 79 does not fall within a predetermined range.

The operation of the VFO part control circuit 712 will be explained in detail. The VFO part control circuit 712 is basically controlled by the VFO gate signal t which becomes active in correspondence with the VFO region, but the control operation is limited by the defect detection signal f delivered from the defect detecting circuit 710 and a RAW gate signal 730 delivered from the system controller 714. Herein, the RAW gate signal 730 represents a read time period for a RAW (Read After Write) mode in which the recorded state of a recording signal is verified immediately after the recording thereof.

Figure 8:
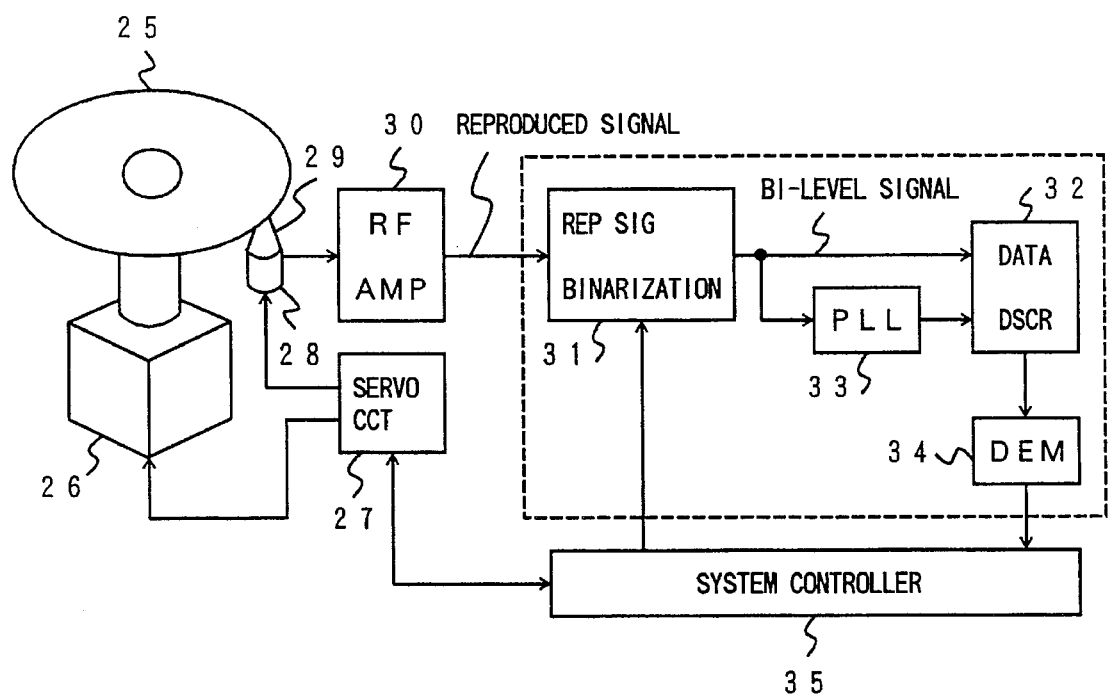
FIG. 8 is a schematic block diagram of an optical disk reproducing apparatus which adopts the present invention.
Figure 9:
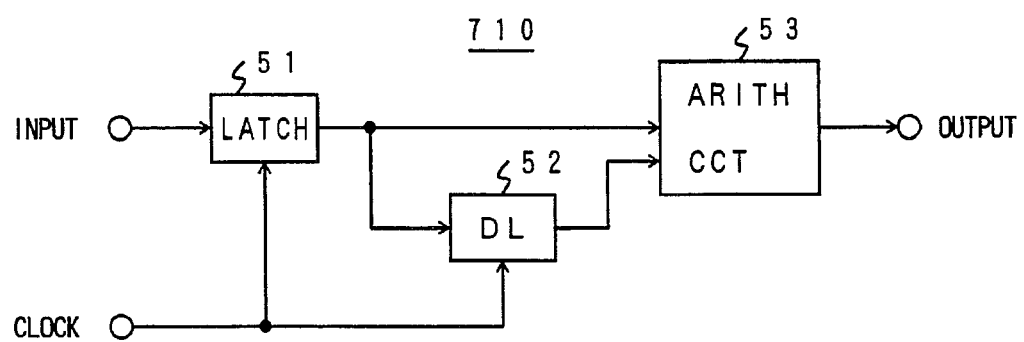
FIG. 9 is a block diagram showing an example of a defect detecting circuit (710) which is included in the apparatus depicted in FIG. 1.

FIG. 9 is a block diagram showing an example of the defect detecting circuit 710 depicted in FIG. 1. An input (the reproduced signal) is applied to a wave-shaping circuit 79 and changed into a binary level signal. This binary level signal is synchronized by a latch 51 with a clock signal whose frequency is proportional to the frequency of the recorded signal. Subsequently, the synchronized signal is delayed for n pulses of the clock signal by a delay unit 52 which is a shift register. The delayed signal and the synchronized signal are subjected to a comparison operation by an arithmetic circuit 53, thereby detecting any defect of the optical disk 25 (FIG. 8). With the defect detecting circuit 710, when the pulse width of the synchronized signal exceeds a predetermined width, the input is regarded as corresponding to the defect, and the arithmetic circuit 53 operates like a retriggerable monostable multivibrator. That is, in a case where the synchronized signal exhibits no status change even after the delay of the n clock pulses, the arithmetic circuit 53 delivers the defect detection signal f. Herein, when a phase-locked signal is used as the clock signal, the operation of detecting defects can be performed uniformly at the inner and outer peripheral parts of the optical disk 25 even in the case of a recording system in which a recording frequency differs depending upon the radial positions of the disk, for example, the ZCAV (zoned constant angular velocity) system.

When the inferior signal exists in the VFO region, the DC correction circuit 72, gain control amplifier 74 and slice level control circuit 77 malfunction at the inferior signal part, and they fail to perform appropriate controls. Therefore, the VFO part control circuit 712 suspends the control operations of the respective circuits 72, 74 and 77 on the basis of the defect detection signal of the detected inferior signal, thereby preventing the malfunctions ascribable to the inferior signal. However, in the case of the sector whose VFO region originally has any recording medium defect such as a flaw, it is known that the defect will enlarge due to a secular change, and that even the dynamic preventive measure will be incapable of suppressing the malfunctions, so the demodulation of the reproduced signal will become impossible. In the RAW mode, therefore, the above preventive measure based on the defect detection signal is inhibited by the RAW gate signal 730. Besides, the sector whose VFO region has the recording medium defect is recognized as a defective sector because the reproduced signal cannot be demodulated therein, and the recording signal is recorded in an alternative sector again.

In order to realize a favorable defect detection, the wave-shaping circuit 79 may limit the band of the input signal or control its slice level depending upon the level of the input signal.

Although, in the circuit arrangement shown in FIG. 1, the DC correction circuit 72, gain control amplifier 74 and slice level control circuit 77 are controlled by the identical control signal b delivered from the VFO part control circuit 712, they may well be controlled by control signals of different timings. Each of the DC correction circuit 72, gain control amplifier 74 and slice level control circuit 77 has a response time, and the element at the succeeding stage does not perform its normal operation during the transient response of the output of the element at the preceding stage because of an inappropriate signal input. Accordingly, it ensures a better control to employ the control signal with which the preceding and succeeding stages are activated at the same timing, or the control signals with which the succeeding stage is activated later than the preceding stage.

In the magneto-optical disk apparatus, the VFO part control circuit 712 performs the control in each of the VFO regions of the address signal part and the data signal part. As stated before, the address signal part and the data signal part are recorded by different methods, and the methods of reading out the recorded signals from the magneto-optical disk are also different. Since the signals of the address signal part and the data signal part are not correlated to each other, the respective signal parts are provided with the reference VFO regions, which need to be controlled independently of each other.

The operation of the signal interpolation control circuit 713 will be explained in detail. The control circuit 713 operates to replace the reproduced signal with the interpolation signal d in the area where the reproduced signal is not demodulated, not only in the unrecorded area of the data signal part, but also in the recorded area thereof. Thus, this circuit 713 maximally suppresses the DC level fluctuation. The signal interpolation operation is basically controlled by a read gate signal e delivered from the system controller 714.

Regarding the read gate signal e, the following two situations shall be specifically mentioned and shall be clearly distinguished: In the preformat area of the recording medium where the preformat signal is recorded beforehand, the read gate signal e is not rendered active, and the reproduced signal is not replaced with the interpolation signal d. The reason therefor is that the reproduced signal derived from the preformat area contains, e.g., the address information of the corresponding sector, which is information required by the system controller 14 at any time. On the other hand, in a case where the recording or erasing operation (write or erase) and the reproducing operation (read) are not simultaneously executed, the read gate signal e is rendered active (a "high" level in FIG. 2) for the replacement of the reproduced signal with the interpolation signal d during the time period of the recording or erasing. The reason therefor is that the normal reproduced signal is not obtained during the recording or erasing operation.

In a case where, even in the negative status ("low" level) of the read gate signal e indicative of the signal reproduction area, the defect detecting circuit 710 or a defect detecting circuit 711 has detected the unrecorded area or the comparatively-long inferior signal area within the reproduction area (as the signal f in FIG. 2), the signal c is replaced by the interpolation signal d on the basis of the defect detection signal f of the defect detecting circuit 710 or 711. This is intended to prevent the quantizing feedback circuit 76 from malfunctioning. The output of the HPF 75 undergoes a great DC level fluctuation in each of the unrecorded area and the comparatively-long inferior signal area. It is the quantizing feedback circuit 76 that suppresses the DC level fluctuation. In the comparatively-long inferior signal area, however, the amplitude of the input signal of the quantizing feedback circuit 76 is nonuniform, whereas the output amplitude of the wave-shaping circuit 722 (FIG. 6A) which generates the signal to be fed back to the input signal is held constant. Consequently, the magnitude of feedback does not become appropriate, and the DC level fluctuation cannot be suppressed satisfactorily.

The unrecorded areas within the reproduction area include a buffer area provided between the respectively adjacent sectors, a gap area between each preformat area and the data area corresponding thereto, an area where the recording operation has been suspended for any reason, etc. In any of such unrecorded areas, the DC level fluctuation cannot be perfectly suppressed when the inappropriate magnitude of feedback or the disagreement between the inverse pass band characteristics of the LPF 723 (FIG. 6A) and the HPF 75 is involved on account of the manufactural dispersion of the circuit arrangement, etc. Therefore, the reproduced signals derived from the unrecorded area and comparatively-long inferior signal area within the reproduction area need to be replaced with the interpolation signal d in order to prevent the DC level fluctuation from arising in the HPF 75 to the greatest possible degree.

The defect detecting circuit 710 performs the operation stated before, and detects also a comparatively-short inferior signal area. In this area, however, the DC level fluctuation in the HPF 75 is slight, so that the reproduced signal need not be replaced with the interpolation signal d. Accordingly, the width or duration of the inferior signal to be detected may well be limited so as to neglect the short inferior signal area. This width is determined in consideration of both the time constant of the HPF 75, and a signal width which can be restored by error correction.

On the other hand, the defect detecting circuit 711 operates to detect the defective area of the recording medium on the basis of the amplitude fluctuation of the reproduced signal. It is effective to detect a situation where the amplitude of the reproduced signal has decreased for a comparatively long time period on account of, e.g., the flaw of or dust on the surface of the optical disk. Since a signal component remains in such an inferior condition, the defect detecting circuit 710 might fail to detect the defective area. It is therefore preferable to use the defect detecting circuit 711 for the defect detection conjointly.

FIG. 10 is a block diagram showing an example of a defect detecting circuit 711 depicted in FIG. 1. The detector circuit 711 includes peak envelope detecting circuits 41, 42 and bottom envelope detecting circuits 43, 44 which detect the peak and bottom envelopes of the reproduced signal being input, respectively. The peak envelope detecting circuit 41 and the bottom envelope detecting circuit 43 have short time constants, and respond to the waveform fluctuation of a defect part of the optical disk 25 comparatively quickly. In contrast, the peak envelope detecting circuit 42 and the bottom envelope detecting circuit 44 have long time constants, and they respond to the waveform fluctuation of a defect part comparatively slowly.

The output of the peak envelope detecting circuit 42 and that of the bottom envelope detecting circuit 44 are respectively shifted in a negative direction and in a positive direction by shift registers (LEVEL SHIFT) 45 and 46. Subsequently, the output of the shift register 45 is compared with that of the peak envelope detecting circuit 41 by a comparator circuit 47, while the output of the shift register 46 is compared with that of the bottom envelope detecting circuit 43 by a comparator circuit 48. The defect part is decided in each of a case where the output of the shift register 45 is higher in potential than that of the peak envelope detecting circuit 41, and a case where the output of the shift register 46 is lower in potential than that of the bottom envelope detecting circuit 43. The logical sum between the outputs of the comparator circuits 47 and 48 is taken by an OR circuit 49, and is sent as the defect detection signal M.

It is also allowed to employ only the defect detecting circuit 710 for detecting the unrecorded area within the reproduction area, or only the defect detecting circuit 711 for detecting the comparatively-long inferior signal area within the same.

The area where the reproduced signal has been replaced with the interpolation signal differs in phase from the reproduced signal, so that the phase synchronization of the PLL deviates in that area. Even when the area has become a reproduced-signal derivation area again, this area requires a long time to reach agreement thereof with the phase synchronization and undergoes an increase in errors. In the area of replacement with the interpolation signal, therefore, the operation of a PLL circuit is hindered so as to keep the status thereof immediately before the replacement. An example of such a technique consists in that a voltage for controlling the oscillation frequency of a VCO (Voltage Controlled Oscillator) of the PLL is held at its value immediately before the placement.

Figure 7:
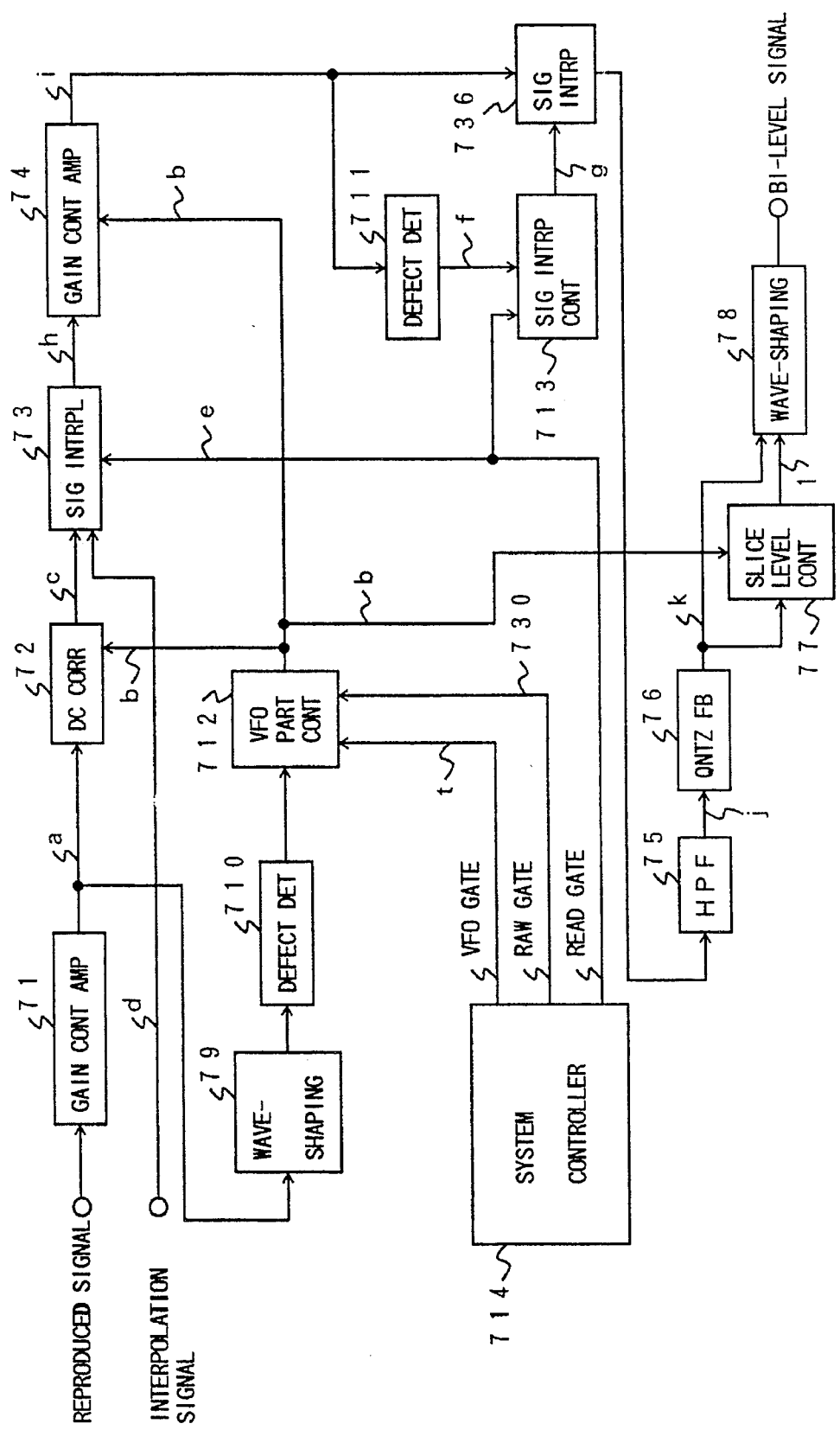
FIG. 7 is a block diagram of a signal reproducing apparatus showing another embodiment of the present invention.

FIG. 7 is a block diagram of a signal reproducing apparatus illustrative of another embodiment of the present invention. Since circuit elements denoted by the same reference numerals as in FIG. 1 operate similarly, only the points of difference from the prior embodiment shown in FIG. 1 shall be explained. In this embodiment, the operation of signal interpolation is performed in two separate stages. The signal interpolation circuit 73 is controlled by the read gate signal e, thereby replacing the output c of the DC correction circuit 72 with the interpolation signal d. The gain control amplifier 74 is controlled by only the control signal b delivered from the VFO part control circuit 712.

Under this condition left intact, however, the amplitude of the signal interpolation part is not held constant, and the quantizing feedback circuit 76 malfunctions. Therefore, the amplitude of the interpolation signal to enter the quantizing feedback circuit 76 is held constant in such a way that a signal interpolation circuit 736 is interposed between the gain control amplifier 74 and the HPF 75, and that the interpolation signal region is brought into the interpolation signal of constant amplitude again by the signal interpolation control circuit 713. The unrecorded area and comparatively-long inferior signal area within the reproduction area are detected by the defect detecting circuit 711 on the basis of the output signal i of the gain control amplifier 74, and the reproduced signals derived from the detected areas are replaced with the interpolation signal by the signal interpolation circuit 736. These operations of detection and replacement are performed for the following reasons: It is the quantizing feedback circuit 76 that malfunctions due to the unrecorded area and comparatively-long inferior signal area within the reproduction area, and no problem is posed when the signal interpolation is done before the input of the circuit 76. Besides, the unrecorded area and comparatively-long inferior signal area within the reproduction area can be detected more favorably when the amplitude of the reproduced signal is held constant by the gain control amplifier 74.

FIG. 8 is a schematic block diagram of an optical disk reproducing apparatus which adopts the present invention. A spindle motor 26 rotates an optical disk 25. An optical pickup 28 is moved to an area bearing desired information on the rotating optical disk 25, and it focuses a laser beam 29 to read out the recorded information. The information read out is amplified by an RF amplifier 30, and the amplified signal is sent as a reproduced signal to a reproduced signal binarization processor 31 which comprises the reproducing system of the present invention. Here in the processor 31, the reproduced signal is turned into the binary level signal.

A phase-locked clock signal is generated on the basis of the binary level signal by a PLL (phase-locked loop) 33. A data discriminator 32 compares the clock signal with the binary level signal, thereby deciding whether the reproduced signal is "1" or "0". The output of the data discriminator 32 is input to a demodulator 34 so as to obtain the recorded original information, which is sent to a system controller 35 in accordance with the system controller 714 shown in FIG. 1. The system controller 35 controls the reproduced signal binarization processor 31, and a servo circuit 27 which drives the spindle motor 26 and the optical pickup 28. Also, the system controller 35 delivers a VFO gate signal explained before. In addition, the reproduced signal is sent to a defect detecting circuit 710 and a defect detecting circuit 711, which supply the reproduced signal binarization processor 31 with a defect detection signal L and a no-signal detection signal M, respectively.

According to each of the embodiments shown in FIGS. 1 and 7 as thus far described, a reproduced signal which has a fluctuation in a low frequency component is replaced with another signal in an area other than a demodulation area and in an unrecorded area as well as a comparatively long inferior signal area. Thus, even in a case where the fluctuation of the low frequency component is removed by an HPF, the signal can be binarized with a fixed slice level and can be stably discriminated.

Figure 13:
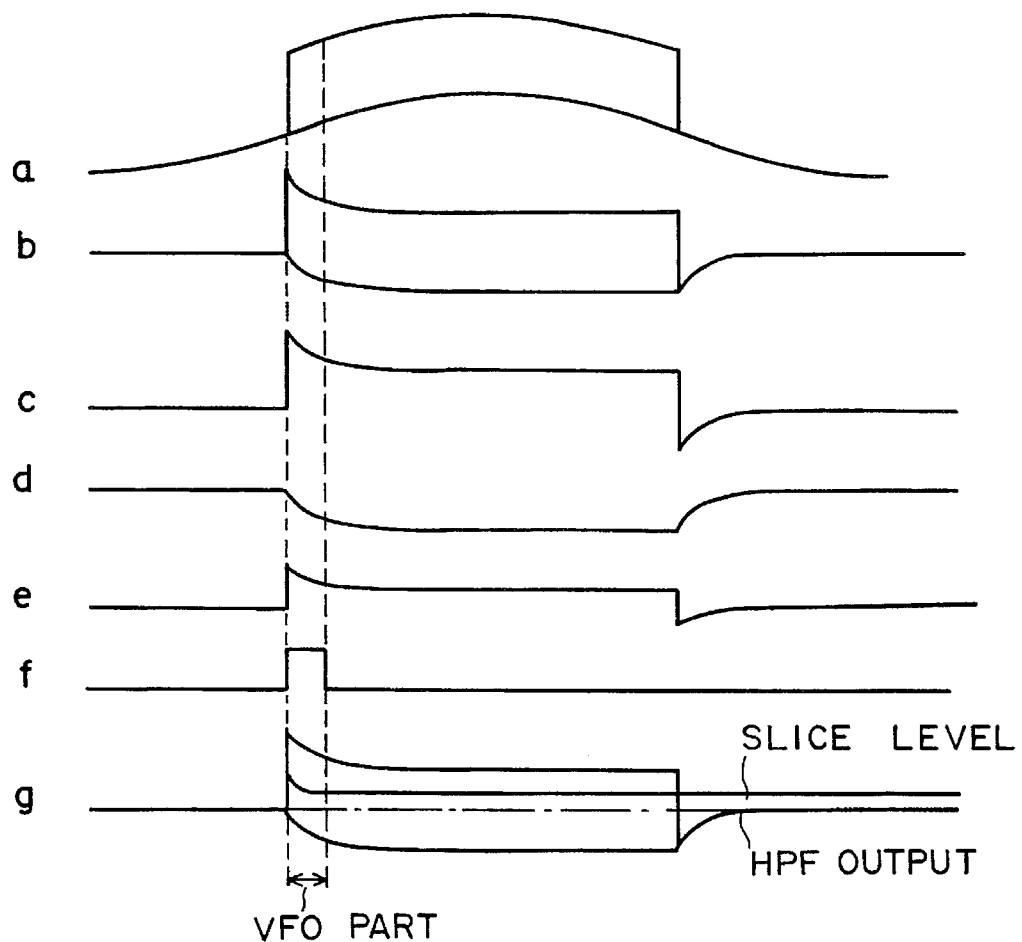
FIGS. 13(a–g) is a waveform diagram for explaining a problem which is to be solved by the embodiment depicted in FIG. 11.

Meanwhile, the prior-art circuit arrangement shown in FIG. 3 might undergo a transient response upon the fluctuation of the average DC (direct current) potential of the HPF (high-pass filter) 2 (hereinbelow, the transient response shall be termed the "sag"). The waveforms of the various parts upon the occurrence of the sag become as illustrated in FIG. 13. In the circuit arrangement, the correct slice level is the level equal to ½ of the signal amplitude. Therefore, in a case where a signal is recorded on only part of one track, there arises the problem that the recorded signal cannot be correctly read due to the sag of the HPF 2.

Figure 11:
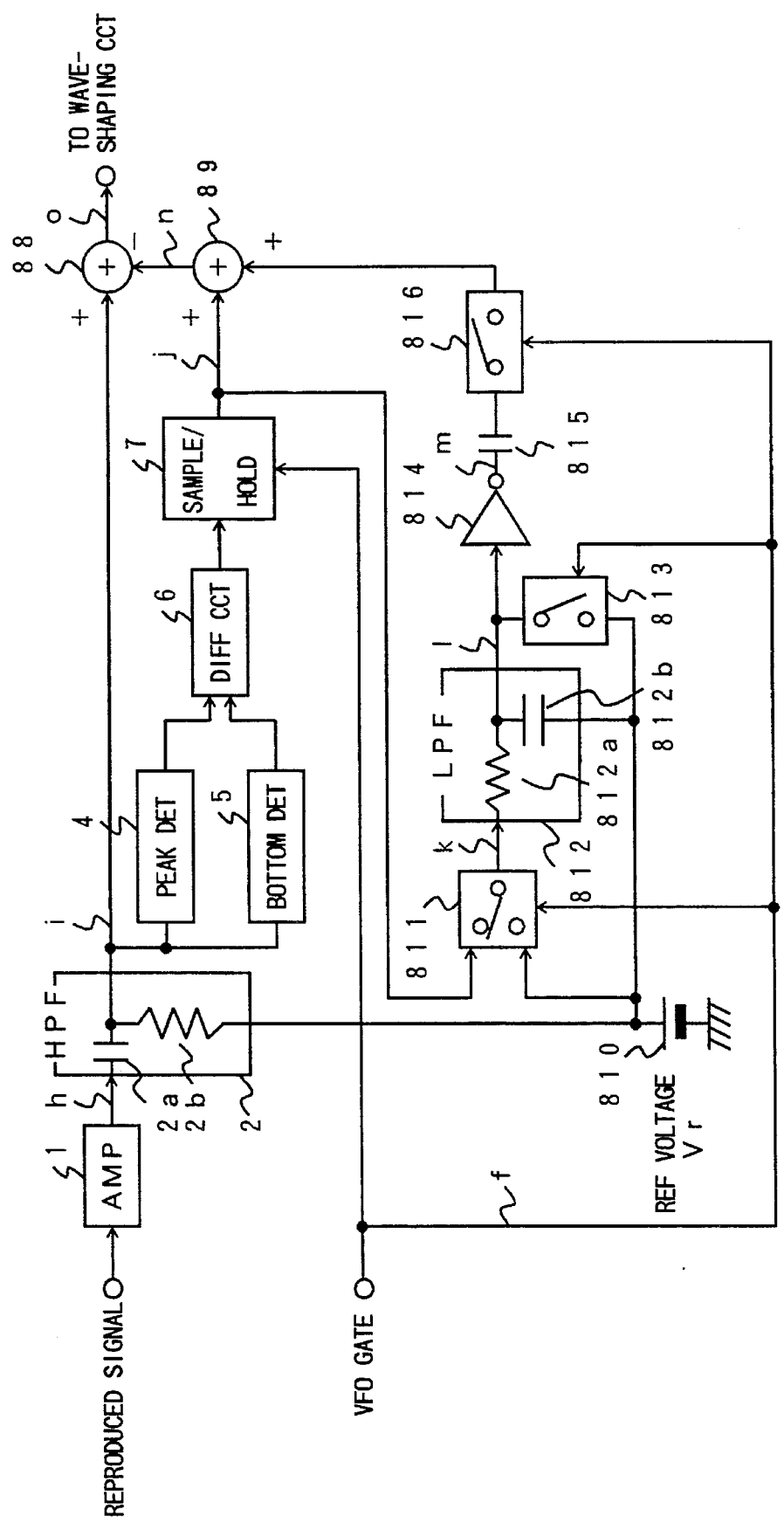
FIG. 11 is a block diagram of a signal reproducing apparatus showing a further embodiment of the present invention.
Figure 12:
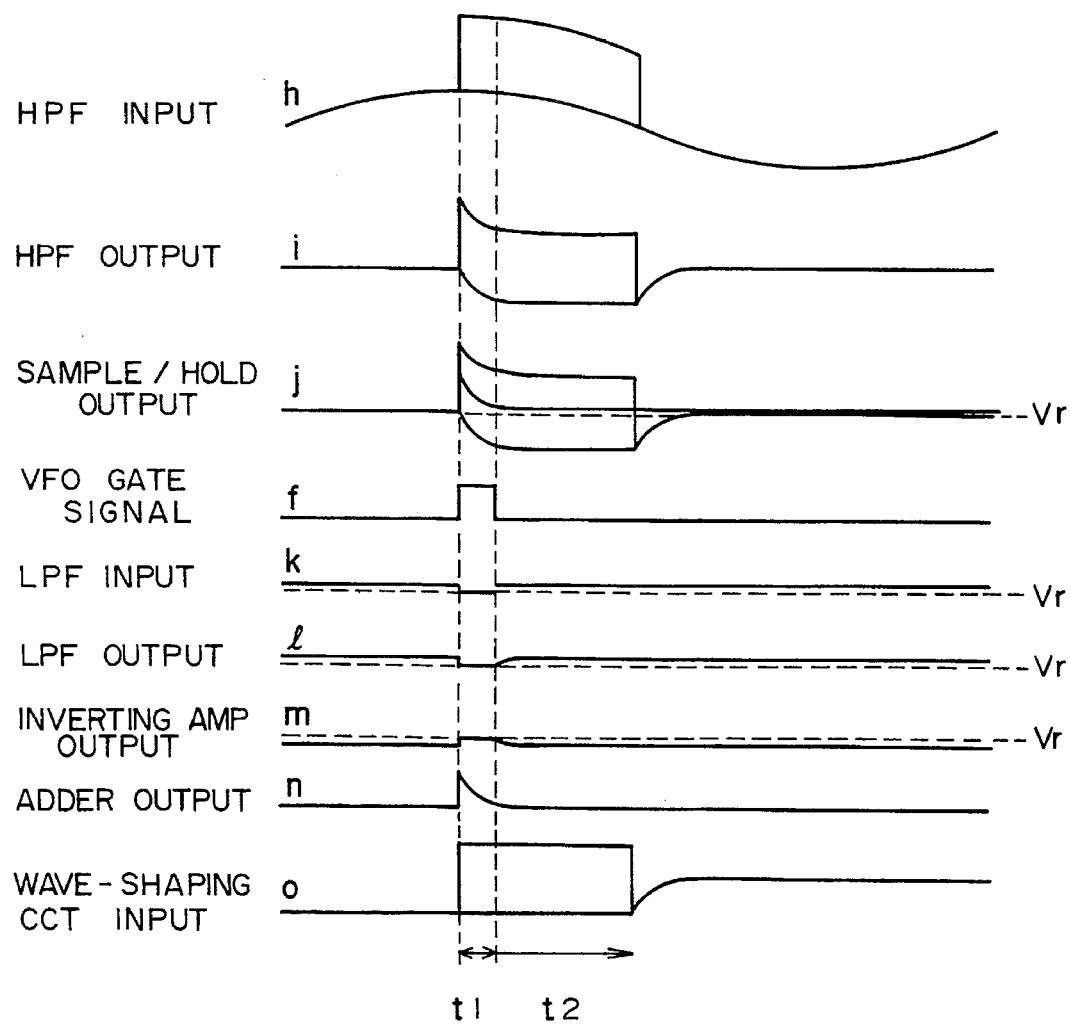
FIG. 12 is a waveform diagram for explaining the operation of the apparatus depicted in FIG. 11.

A further embodiment of the present invention concerning the sag is illustrated in FIG. 11. FIG. 12 illustrates waveforms at various parts in FIG. 11 in order to explain the operation of the embodiment. Incidentally, reference symbols "h"~"o" indicated in FIGS. 11 and 12 designate positions different from those of the equivalent reference symbols indicated before.

Figure 3:
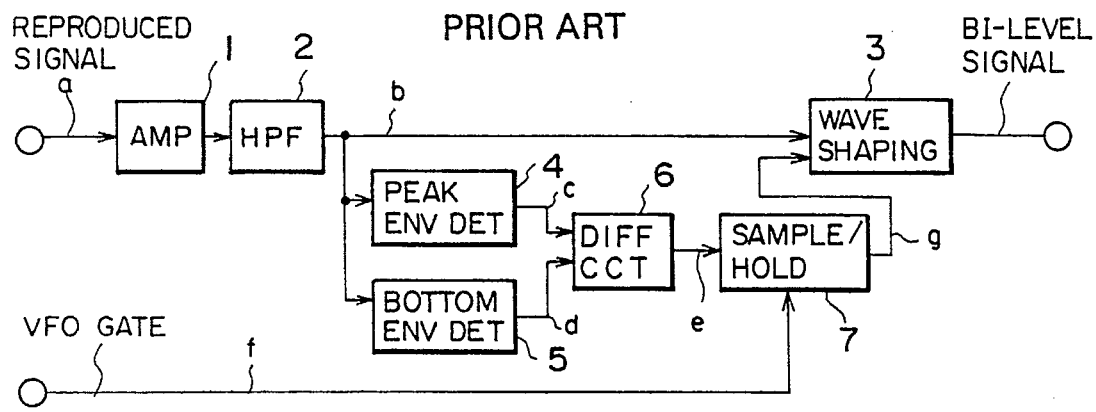
FIG. 3 is a block diagram showing an example of a signal reproducing apparatus in order to clarify the background of the present invention.
Figure 4:
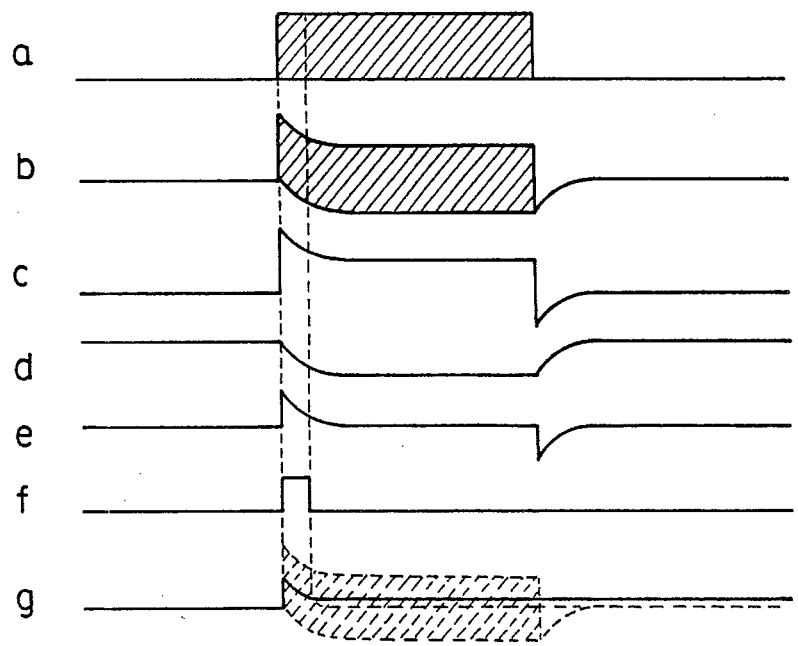
FIGS. 4(a–g) is a waveform diagram for explaining the operation of the signal reproducing apparatus depicted in FIG. 3.

The circuit arrangement shown in FIG. 11 consists in improvements in that part of the prior-art circuit arrangement in FIG. 3 which extends from the input side thereof to the stage thereof preceding the wave-shaping circuit 3.

Referring to FIGS. 11 and 12, a reproduced signal which contains the retardation (the fluctuation of a low frequency component) is amplified by an amplifier 1 into a reproduced signal h, which is input to an HPF 2 configured of a capacitor 2a and a resistor 2b. The reproduced signal h having entered the HPF 2 has the retardation component eliminated therefrom, and information has been modulated and recorded on a recording medium beforehand so that the reproduced signal (the input signal of the signal reproducing apparatus in the embodiment) may be held free from a DC component. For these reasons, the output waveform of the HPF 2 becomes as shown at i in FIG. 12. More specifically, the HPF output waveform i is the waveform of a transient response (sag) upon the fluctuation of an average DC potential as is determined by the time constant between the capacitance and resistance of the respective circuit elements 2a and 2b constituting the HPF 2. The waveform i is such that the center level of the amplitude thereof changes so as to gradually come into agreement with the reference voltage Vr of a reference voltage source 810 toward the end part of the reproduced signal h.

Subsequently, the HPF output i is supplied to a peak detecting circuit 4 and a bottom detecting circuit 5, thereby detecting the upper or peak envelope and the lower or bottom envelope of the signal i, respectively. Further, the difference waveform between the peak and bottom envelopes is produced by a difference circuit 6. This difference waveform follows up the sag waveform of the HPF 2 at the VFO (variable frequency oscillator) part of the reproduced signal for the reason that, since the VFO part (sync region) serves as the reference of the reproduced signal, the envelopes detected therefrom are appropriate. At the part of the reproduced signal other than the VFO part, however, the difference waveform does not follow up the sag waveform for the reason that, since diverse duty factors are exhibited at the reproduced signal part, detection errors ascribable to unequal sensitivities for the peak detection and the bottom detection develop to produce an inappropriate envelope waveform.

As indicated by a sample/hold output j, therefore, a sample-and-hold circuit 7 delivers the very output waveform of the difference circuit 6 during a VFO period t1, and delivers a voltage obtained by holding the output waveform of the difference circuit 6 with a VFO gate signal f, during a time period t2 other than the VFO period. An LPF (low-pass filter) 812 has the same degree and the same time constant as those of the HPF 2, and includes a resistor 812a and a capacitor 812b. As indicated by an LPF input waveform k, the LPF 812 is supplied with the voltage Vr of the reference voltage source 810 during the VFO period t1, and is supplied with the voltage j held by the sample-and-hold circuit 7, during the time period t2 other than the VFO period t1. This input operation is effected by a change-over switch 811 which is controlled by the VFO gate signal f. As indicated by an LPF output 1, during the VFO period t1, the output of the LPF 812 is forcibly brought to the voltage Vr of the reference voltage source 810 by an LPF reset switch 813 which is controlled by the VFO gate signal f. On the other hand, during the time period t2 other than the VFO period, it becomes a charging waveform which depends upon the voltage j held by the sample-and-hold circuit 7 and the time constant between the resistance and capacitance of the respective elements 812a and 812b constituting the LPF 812.

As stated above, the LPF 812 is reset during the time period t1, which is the VFO period. This is intended to start the charging waveform at the voltage Vr of the reference voltage source 810 without fail because the sag waveform of the HPF 2 appears with reference to the reference voltage Vr.

The LPF output l is inverted and amplified as indicated by the output m of an inverting amplifier 814. This output m is applied to an adder 89 through a capacitor 815 as well as a switch 816 which is controlled by the VFO gate signal f. Thus, the part of the waveform m corresponding to the time period t2 is added to the output j of the sample-and-hold circuit 7, thereby obtaining the output n of the adder 89. During the VFO period t1, the adder output n follows up the envelope waveform of the reproduced signal, that is, the sag waveform of the HPF 2. Besides, during the time period t2, the adder output n becomes the same waveform as the output i of the HPF 2 corresponding to the time period t2, owing to the same degree and the same time constant of the HPF 2 and the LPF 812, so that the obtained waveform is equal to the sag waveform of the HPF 2 in the reproduced signal of the recorded area of the recording medium. Subsequently, an adder 88 subtracts the output n of the adder 89 from the output i of the HPF 2. Thus, the HPF output i is freed from the sag of the HPF 2 in the reproduced signal of the recorded area and is turned into a waveform o. This waveform o is input to the wave-shaping circuit 3 (shown in FIG. 3). In this way, even when the binarizing slice level is detected in the time period of the VFO part, the recorded signal can be appropriately binarized.

Figure 14:
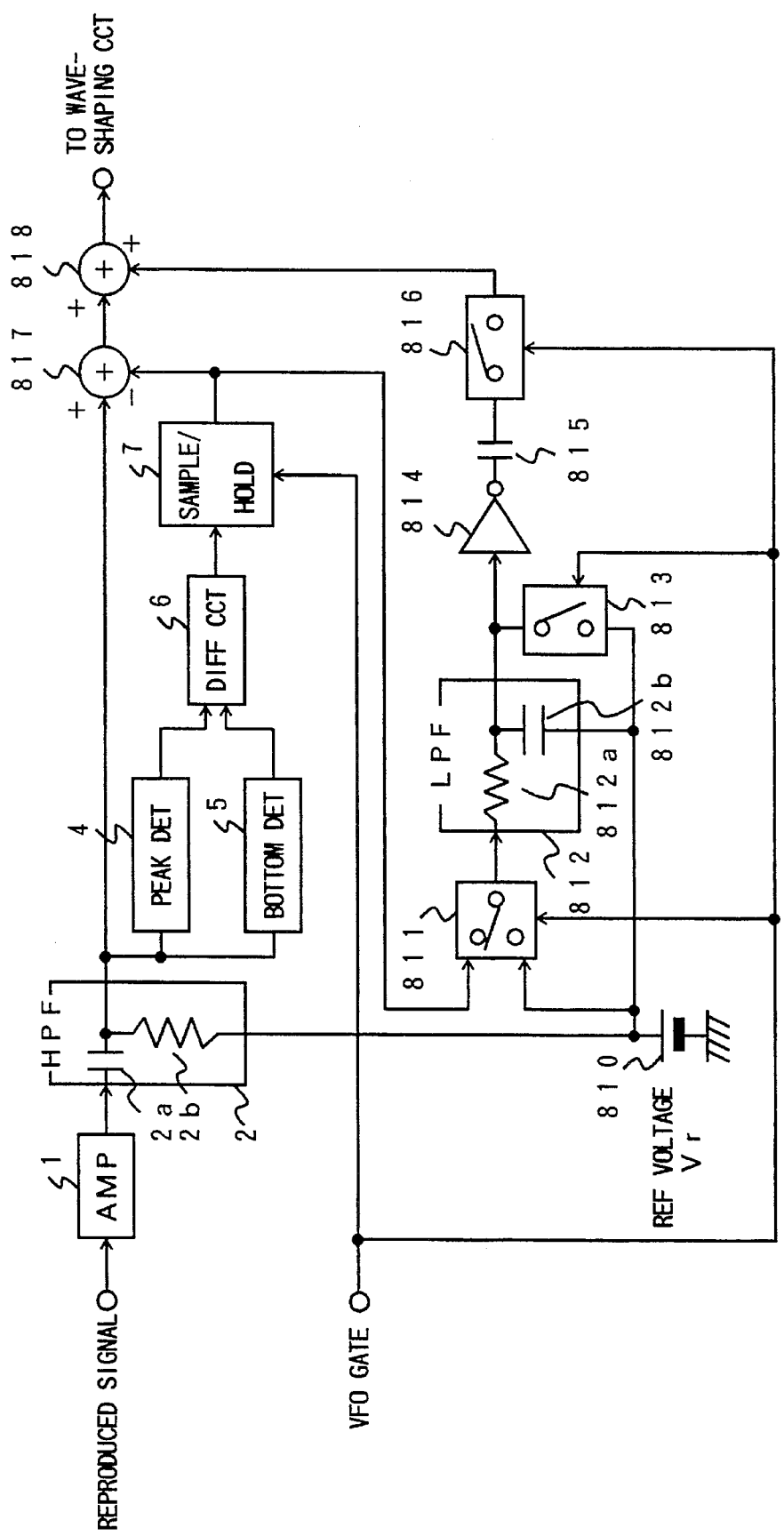
FIG. 14 is a block diagram showing a modification of the embodiment shown in FIG. 11.

FIG. 14 illustrates a modification of the embodiment shown in FIG. 11. As the further embodiment shown in FIG. 11, an HPF 2 and an LPF 812 have the same degree and the same time constant. Likewise to those of the preceding embodiment shown in FIG. 11, a peak detecting circuit 4, a bottom detecting circuit 5, a difference circuit 6 and a sample-and-hold circuit 7 operate to detect a waveform following up the envelope waveform of a reproduced signal, that is, the sag waveform of the HPF 2, during the time period of the VFO part of the reproduced signal. Here in this modification, an adder 817 eliminates the sag of the HPF 2 arising in the time period of the VFO part. Like those of the preceding embodiment shown in FIG. 11, a change-over switch 811, the LPF 812, a reset switch 813, an inverting amplifier 814, a capacitor 815 and a switch 816 operate to generate the same waveform as the output of the HPF 2 corresponding to the time period other than that of the VFO part. Here in this modification, an adder 818 eliminates the sag of the HPF 2 arising in the time period other than that of the VFO part. Thus, this modification can bring forth the same effect as that of the preceding embodiment shown in FIG. 11. That is, even when the binarizing slice level is detected in the time period of the VFO part, the recorded signal can be appropriately binarized.

Figure 15:
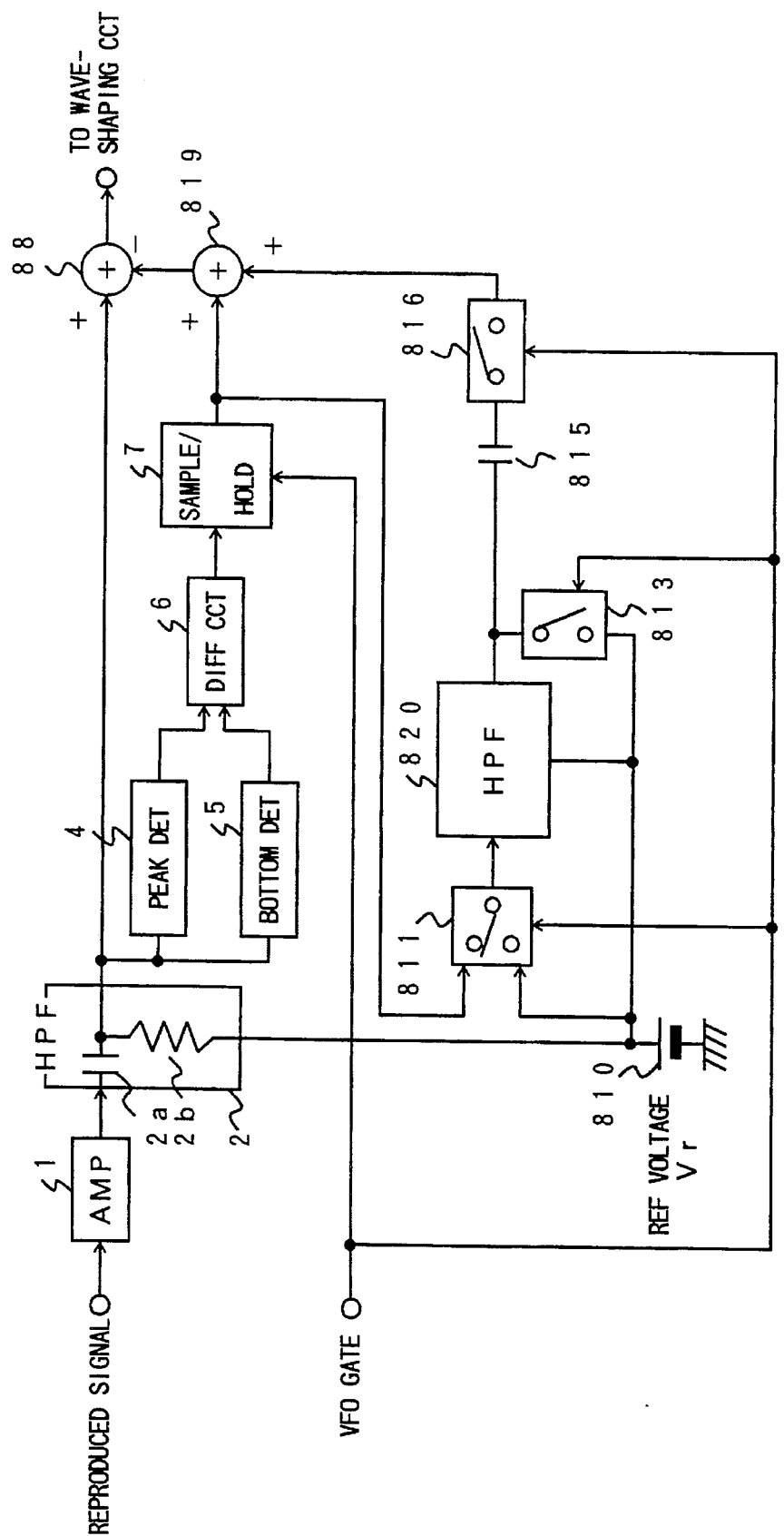
FIG. 15 is a block diagram showing another modification of the embodiment shown in FIG. 11.

FIG. 15 illustrates another modification of the embodiment shown in FIG. 11. In this arrangement, the functions of the LPF 812 and the inverter circuit 814 in FIG. 11 are achieved by means of an HPF 820. The HPF 2 and the HPF 820 have the same degree and the same time constant. Like those of the foregoing embodiment shown in FIG. 11, a peak detecting circuit 4, a bottom detecting circuit 5, a difference circuit 6 and a sample-and-hold circuit 7 operate to detect a waveform following up the envelope waveform of a reproduced signal, that is, the sag waveform of the HPF 2, during the time period of the VFO part of the reproduced signal. In the same manner as in the foregoing embodiment shown in FIG. 11, a change-over switch 811, the HPF 820, a reset switch 813, a capacitor 815 and a switch 816 operate to generate the same waveform as the output of the HPF 2 corresponding to the time period other than that of the VFO part. Further, an adder 819 produces a waveform equal to the sag waveform of the HPF 2 in the reproduced signal of the recorded area of the recording medium, and an adder 88 subtracts the output of the adder 819 from the output of the HPF 2. Thus, this modification can bring forth the same effect as that of the foregoing embodiment shown in FIG. 11. That is, even when the binarizing slice level is detected in the time period of the VFO part, the recorded signal can be appropriately binarized.

In a case where the LPF 812 in FIG. 11 or FIG. 14 or the HPF 820 in FIG. 15 has its DC operation brought into agreement with the DC operation of the corresponding adder located at the succeeding stage thereof, a similar effect is attained without the capacitor 815.

According to each of the embodiment and modifications shown in FIGS. 11, 14 and 15, in a case where an HPF for eliminating the influence of retardation is provided for an optical disk of great retardation, even a signal recorded on only part of one track can be binarized with a fixed slice level and can be correctly reproduced.

Now, another approach to the elimination of the influence of the retardation (the fluctuation of a low frequency component) will be described with reference to FIGS. 16 through 24.

Figure 16:
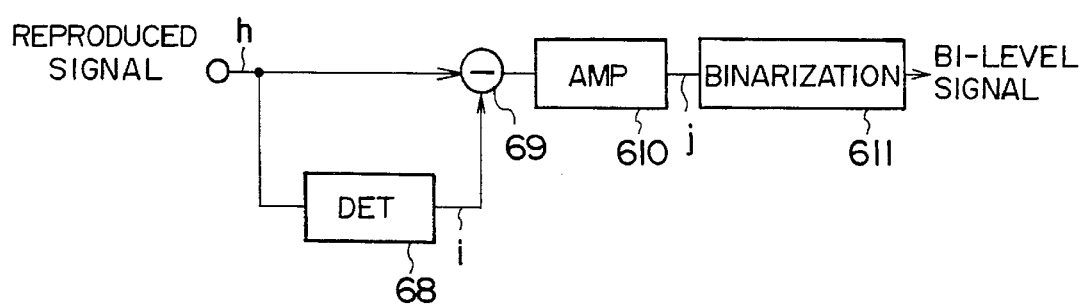
FIG. 16 is a block diagram of the input portion of a signal reproducing apparatus showing a further embodiment of the present invention.
Figure 17:
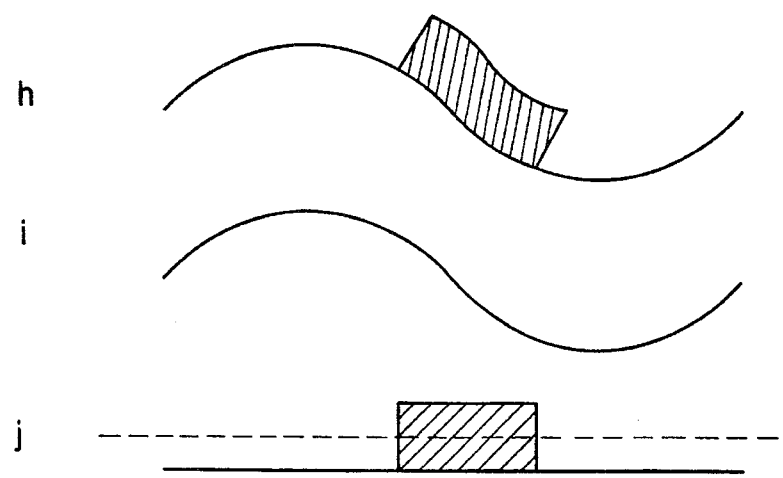
FIG. 17 is a waveform diagram for explaining the operation of the apparatus depicted in FIG. 16.

FIG. 16 is a block diagram showing the input portion of a signal reproducing apparatus in a yet further embodiment of the present invention, while FIG. 17 is a diagram showing waveforms at the parts of the signal reproducing apparatus in order to explain the operation of the apparatus. An amplifier circuit 610 in FIG. 16 corresponds to the amplifier 1 in FIG. 3, and a binarization circuit 611 corresponds to the elements of the HPF 2, et seq. in FIG. 3. A reproduced signal derived from an optical disk is illustrated at h in FIG. 17 as to a case where the retardation is involved in the reproduced signal a shown in FIG. 4. A detection circuit 68 detects the signal component of the retardation from the reproduced signal h, and delivers an output waveform shown as a detection signal i in FIG. 17. Using the detection signal i, a subtraction circuit 69 subtracts the signal component of the retardation from within the reproduced signal h. The resulting waveform becomes the input signal j of the binarization circuit 611 after the amplification thereof by the amplifier circuit 610. Thus, the reproduced signal h can be freed from the influence of the retardation, and the HPF 2, included in the prior-art example (FIGS. 3 and 4) in order to eliminate the influence of the retardation, can be omitted. Accordingly, even in a case where a signal is recorded on only part of one track, the signal can be binarized (turned into a binary level) with a fixed slice level and can be correctly reproduced. Alternatively, the cutoff frequency of the HPF 2 can be lowered as long as the signal recorded on only part of one track can be binarized with the fixed slice level and can be correctly reproduced. Moreover, the dynamic range of the amplifier circuit 610 posterior to the subtraction circuit 69 can be narrowed owing to the elimination of the influence of the retardation. Practicable examples of the detection circuit 68 will be explained later.

Figure 18:
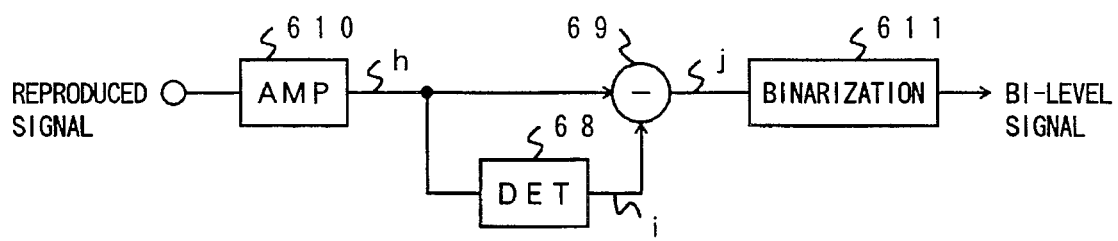
FIG. 18 is a block diagram showing a modification of the embodiment shown in FIG. 16.

In this case, the amplifier circuit 610 referenced in the embodiment shown in FIG. 16 may well be arranged at the first stage of the input portion as shown in FIG. 18.

Figure 19:
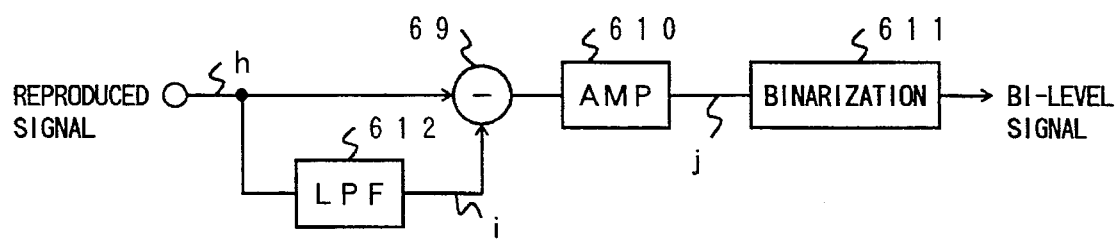
FIG. 19 is a block diagram showing another modification of the embodiment shown in FIG. 16.

FIG. 19 illustrates another modification of the embodiment shown in FIG. 16. Since the frequency of a recorded signal and that of the retardation differ greatly, a low-pass filter (hereinbelow, abbreviated to "LPF") 612 can be employed as the detection circuit 68 shown in FIG. 16. This modification can achieve effects similar to those of the embodiment shown in FIG. 16.

Figure 20:
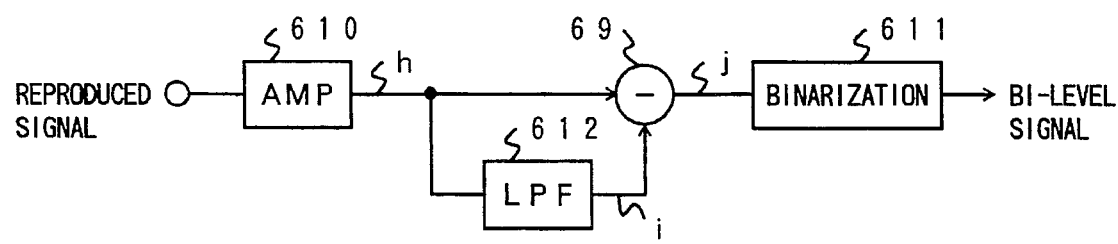
FIG. 20 is a block diagram showing a modification of the arrangement shown in FIG. 19.

In this case as shown in FIG. 20, the amplifier circuit 610 may well be arranged at the first stage of the input portion of the another modification shown in FIG. 19.

Figure 21:
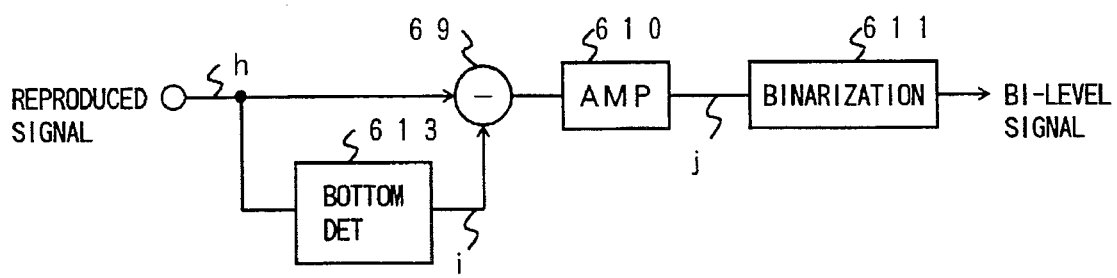
FIG. 21 is a block diagram showing a further modification of the embodiment shown in FIG. 16.

FIG. 21 illustrates a further modification of the embodiment shown in FIG. 16. Since the signal component of the retardation can be detected by detecting the bottom part of the reproduced signal h, this modification employs a bottom detecting circuit 613 as the detection circuit 68 shown in FIG. 16. This modification can achieve effects similar to those of the embodiment shown in FIG. 16. Incidentally, the bottom detecting circuit 613 can detect the envelope of the majority of the signal h shown in FIG. 17. Such a circuit is used in an AM (amplitude modulation) detection circuit device, and performs fast charge and slow discharge through the rectification of a diode.

Figure 22:
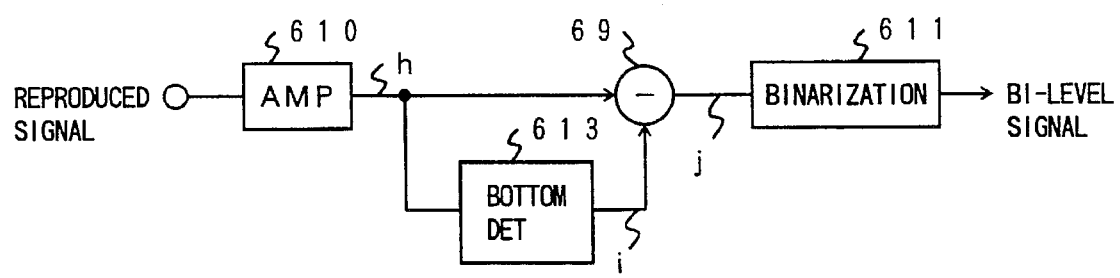
FIG. 22 is a block diagram showing a modification of the arrangement shown in FIG. 21.

In this case as shown in FIG. 22, the amplifier circuit 610 may well be arranged at the first stage of the input portion of the modification shown in FIG. 21.

Figure 23:
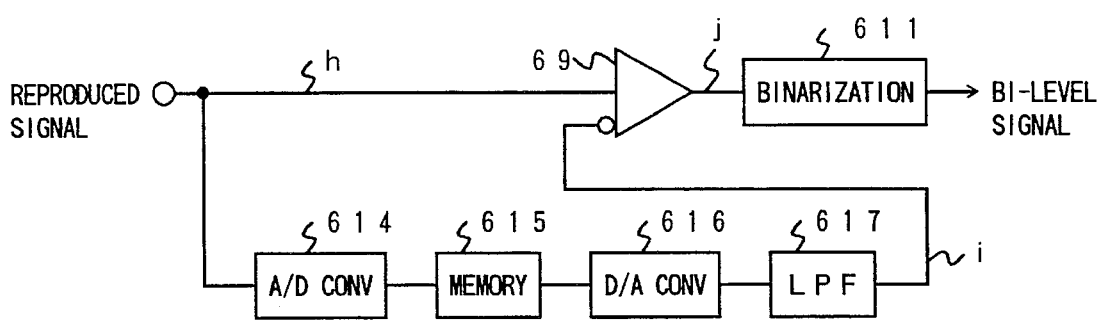
FIG. 23 is a block diagram showing yet another modification of the embodiment shown in FIG. 16.

FIG. 23 illustrates a yet further modification of the embodiment shown in FIG. 16. This modification is applied to a case where the signal components of the retardation are substantially equal at the innermost periphery and outermost periphery of the disk and where the relative positions of the respective parts within the disk are recorded beforehand or can be detected. In this case, a previous operation is so performed that either of the unrecorded parts of the disk is played back, and so that the retardation waveform is stored in a memory 615 by the use of an A/D (analog-to-digital) converter 614. In an information reproducing operation, the data of the retardation waveform is read out of the memory 615 at that part of the disk at which a recorded signal is reproduced, and the signal component of the retardation is subtracted from within the reproduced signal h via a D/A (digital-to-analog) converter 616 as well as an LPF 617. Thus, this modification can achieve effects similar to those of the embodiment shown in FIG. 16. Here, corrections of high accuracy can be made by heightening the resolutions and sampling frequencies of the A/D converter 614 and D/A converter 616, because no phase lag, etc. is involved, unlike in the case of employing the LPF 612 or the bottom detecting circuit 613 as the detection circuit 68.

Figure 24:
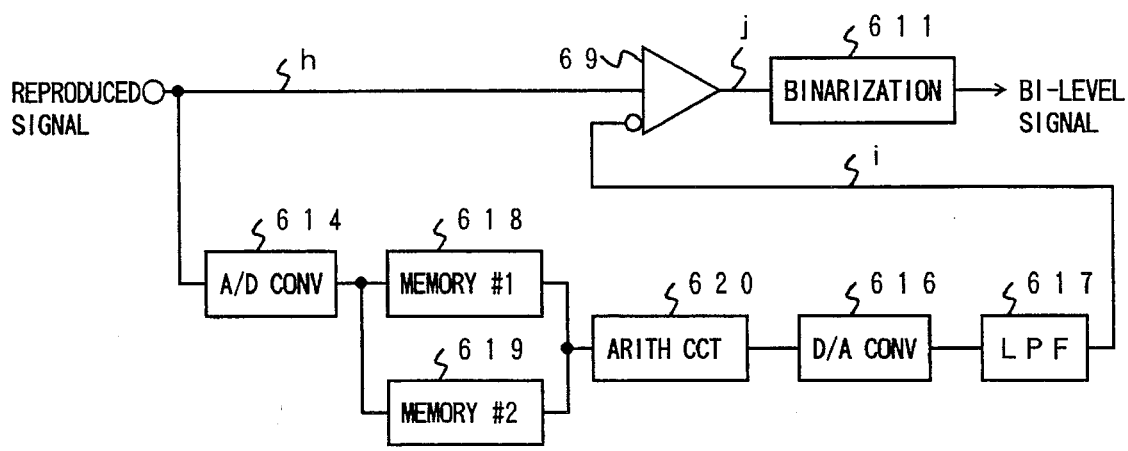
FIG. 24 is a block diagram showing still a further modification of the embodiment shown in FIG. 16.

FIG. 24 illustrates a still further modification of the embodiment shown in FIG. 16 of the present invention. This modification is applied to a case where the signal components of the retardation have a certain difference at the innermost periphery and outermost periphery of the disk and where the relative positions of the respective parts within the disk are recorded beforehand or can be detected. In this case, a previous operation is performed so that the unrecorded part at the innermost periphery is played back, whereupon the retardation waveform at this part is stored in a memory 618 (memory #1) by the use of an A/D converter 614, and so that the unrecorded part at the outermost periphery is played back, whereupon the retardation waveform at this part is stored in a memory 619 (memory #2) by the use of the A/D converter 614. In an information reproducing operation, the corrected waveform of the retardation is calculated on the basis of the contents of the memories 618 and 619 by an arithmetic circuit 20 at that part of the disk at which a recorded signal is reproduced, and the signal component of the retardation is subtracted from within the reproduced signal h via a D/A converter 616 as well as an LPF 617. Thus, this modification can achieve effects similar to those of the embodiment shown in FIG. 16.

In each of the modifications shown in FIGS. 17 through 24, the disk parts whose retardation waveforms are stored are not limited to the innermost periphery and the outermost periphery. In a case where the recording track of the disk is divided into several zones, the reproduced signal h can be corrected more accurately by storing the retardation waveforms of the respective zones.

By way of example, in the case of correcting a reproduced signal ("MO" signal) which is derived in the form of the change of the magnetic field of a recording medium in a magneto-optical disk apparatus, a reproduced signal ("WO" signal) which is derived in the form of the intensity of light reflected from the recording medium is contained in the MO signal due to an MO signal detecting method, and the detection circuit 68 sometimes malfunctions. On this occasion, effects similar to those of the embodiment shown in FIG. 16 can be attained by providing a hold circuit in order that the detection circuit 68 may respond to only the MO signal.

The embodiments and modifications shown in FIGS. 16 through 24 thus far described bring forth the effect that, in an optical disk of large retardation, an HPF for eliminating the influence of the retardation can be omitted. Accordingly, even in a case where a signal is recorded on only part of one track, the signal can be binarized with a fixed slice level and can be correctly reproduced. Alternatively, the cutoff frequency of the HPF can be lowered as long as the signal recorded on only part of one track can be binarized with the fixed slice level and can be correctly reproduced. Moreover, these embodiments and modifications bring forth the effect that the dynamic range of an amplifier circuit posterior to a subtraction circuit can be narrowed owing to the elimination of the influence of the retardation.

What is claimed is:

1. An information reproducing apparatus for reproducing recorded information from a recording medium in which each sector of the recording medium has at least one area bearing a specific pattern expressive of a synchronizing signal for phase-locking a clock signal for demodulating data, comprising:

reproduction means for deriving a reproduced signal including said specific pattern from said recording medium;

DC (direct current) level correction means for correcting a DC level of said reproduced signal so that a DC level of a part of said reproduced signal corresponding to said specific pattern as derived by said reproduction means agrees with a predetermined reference level;

means for receiving a read gate signal indicative of a first time period during which said reproduced signal derived by said reproduction means is to be demodulated;

AC (alternating current) signal generation means for generating an AC signal whose average potential is equal to said predetermined reference level; and signal replacement means for substituting said AC signal for said reproduced signal in a second time period other than said first time period indicated by said read gate signal.

2. An information reproducing apparatus as defined in claim 1, wherein said AC signal is an AC signal which has a duty factor of 50%.

3. An information reproducing apparatus as defined in claim 1, further comprising means for detecting an inferior signal which is contained in said reproduced signal on account of any defect of said recording medium, said signal replacement means substituting said AC signal for said inferior signal when said inferior signal has been detected by the detection means.

4. A method for reproducing recorded information from a recording medium in which each sector has at least one area bearing a specific pattern expressive of a synchronizing signal for phase-locking a clock signal for demodulating data, comprising the steps of:

deriving a reproduced signal including said specific pattern from said recording medium;

correcting a DC (direct current) level of said reproduced signal so that a DC level of a part of said reproduced signal corresponding to said specific pattern agrees with a predetermined reference level; and replacing a part of the DC corrected reproduced signal by a predetermined AC (alternating current) signal whose average potential is equal to said predetermined reference level, in a time period other than a time period during which the reproduced signal is to be demodulated.

5. An information reproducing apparatus for reproducing recorded information from a recording medium in which each sector has at least one area bearing a specific pattern expressive of a synchronizing signal for phase-locking a clock signal for demodulating data, comprising:

reproduction means for deriving a reproduced signal which contains a fluctuation of a low frequency component, from said recording medium;

detection means for detecting said low frequency component from within said reproduced signal delivered from said reproduction means;

subtraction means for subtracting said low frequency component detected by said detection means, from said reproduced signal; and binarization means for converting an output of said subtraction means into a bi-level signal:

wherein said detection means includes a non-recording level detecting circuit which detects said low frequency component from within a part of said reproduced signal as derived from an unrecorded part of said recording medium, and wherein said information reproducing apparatus further comprises memory means for storing therein a low frequency component which is to be afforded to said binarization means;

wherein said memory means includes a first memory which stores therein the low frequency component of the reproduced signal part as detected by said detection means from the unrecorded part at an outer peripheral edge of a disk being said recording medium, and a second memory which stores therein the low frequency component of the reproduced signal part as detected by said detection means from the unrecorded part at an inner peripheral edge of said disk; and wherein said information reproducing apparatus further comprises arithmetic means for executing predetermined operations for the data stored in the first and second memories, thereby to generate said low frequency component which is to be afforded to said binarization means.

6. An information reproducing apparatus for reproducing recorded information from a recording medium in which each sector of the recording medium has at least one area bearing a specific pattern expressive of a synchronizing signal for phase-locking a clock signal for demodulating data, comprising:

means for receiving a signal, including said specific pattern, reproduced from said recording medium;

means for correcting a DC level of the reproduced signal so that a DC level of a part of said reproduced signal corresponding to said specific pattern agrees with a predetermined reference level;

means for providing an interpolation signal whose average potential is equal to said predetermined reference level;

means for modifying the corrected reproduced signal by replacing the corrected reproduced signal with said interpolation signal in a time period other than a time period during which the reproduced signal is to be demodulated; and means for demodulating said corrected reproduced signal which has been modified by said interpolation signal.

7. An information reproducing apparatus as claimed in claim 6, further comprising:

detection means for detecting a fluctuation of a low frequency component from within said reproduced signal;

subtraction means for subtracting said low frequency component from said reproduced signal; and binarization means for converting an output of said subtraction means into a bi-level signal;

wherein said detection means includes a non-recording level detecting circuit which detects said low frequency component from within a part of said reproduced signal as derived from a nonrecorded part of said recording medium;

wherein said information reproducing apparatus further comprises memory means for storing therein the low frequency component;

wherein said memory means includes a first memory which stores therein the low frequency component of the reproduced signal part as detected from the nonrecorded part at an outer peripheral edge of the recording medium, and a second memory which stores therein the low frequency component of the reproduced signal part as detected from the nonrecorded part at an inner peripheral edge of the recording medium; and wherein said information reproducing apparatus further comprises arithmetic means for executing predetermined operations on the data stored in the first and second memories to thereby generate said low frequency component subtracted by said subtraction means.

8. An information reproducing apparatus as claimed in claim 6, further comprising:

a first filter for eliminating a low frequency component from said reproduced signal;

first detection means for detecting a change of said reproduced signal attributed to a transient response of an output of said first filter which develops due to an average DC potential fluctuation of said reproduced signal during a reproduction time period for said area bearing the specific pattern;

second detection means including a second filter having the same degree and time constant as said first filter, for detecting a change of said reproduced signal attributed to the transient response which develops during a time period other than the reproduction time period for said area bearing said specific pattern;

addition means for adding outputs of said first and second detection means; and subtraction means for subtracting an output of said addition means from said output of said first filter.

9. An information reproducing apparatus as claimed in claim 8, wherein said second filter includes a low-pass filter which receives said reproduced signal, and an inverter circuit which inverts an output of said low-pass filter.

10. An information reproducing apparatus as claimed in claim 8, wherein said second filter includes a high-pass filter which receives said reproduced signal.

11. A method for reproducing recorded information from a recording medium in which each sector has at least one area bearing a specific pattern expressive of a synchronizing signal for phase-locking a clock signal for demodulating data, comprising the steps of:

deriving a reproduced signal including said specific pattern from said recording medium;

correcting a DC (direct current) level of said reproduced signal so that a DC level of a part of said reproduced signal corresponding to said specific pattern agrees with a predetermined reference level; and replacing a part of the DC corrected reproduced signal by a predetermined signal whose average potential is equal to said predetermined reference level, in a time period other than a time period during which the reproduced signal is to be demodulated.

12. A method for reproducing recorded information as claimed in claim 11, wherein said deriving step derives a reproduced signal containing a fluctuation of a low frequency component;

and wherein the method further comprises the steps of:

detecting said low frequency component from within said reproduced signal;

subtracting said low frequency component from said reproduced signal to produce a difference signal; and converting the difference signal into a bi-level signal.

* * * * *